US010429097B1

(12) United States Patent
Sexton

(10) Patent No.: US 10,429,097 B1
(45) Date of Patent: Oct. 1, 2019

(54) EXPANSION TANK WALL MOUNT BRACKET APPARATUS AND METHOD OF USE

(71) Applicant: Rex A. Sexton, Arrington, TN (US)

(72) Inventor: Rex A. Sexton, Arrington, TN (US)

(*) Notice: Subject to any disclaimer, the term of this patent is extended or adjusted under 35 U.S.C. 154(b) by 0 days.

(21) Appl. No.: 15/905,040

(22) Filed: Feb. 26, 2018

Related U.S. Application Data

(60) Provisional application No. 62/463,807, filed on Feb. 27, 2017.

(51) Int. Cl.
  *F16M 11/00* (2006.01)
  *F24H 9/06* (2006.01)
  *F24H 1/18* (2006.01)
  *F16M 13/02* (2006.01)

(52) U.S. Cl.
  CPC ............ *F24H 9/06* (2013.01); *F16M 13/02* (2013.01); *F24H 1/188* (2013.01)

(58) Field of Classification Search
  CPC .................................. F24H 1/188; F24H 9/06
  See application file for complete search history.

(56) References Cited

U.S. PATENT DOCUMENTS

| | | | |
|---|---|---|---|
| 2,344,556 A | 3/1944 | Manley | |
| 2,615,238 A | 10/1952 | Highwood | |
| 4,134,566 A | 1/1979 | Spitzack | |
| 4,254,926 A | 3/1981 | Reeberg | |
| 5,362,022 A * | 11/1994 | McLoughlin | A62B 25/00 224/262 |
| 6,769,659 B1 * | 8/2004 | Martello | B60N 3/103 248/154 |
| 8,220,764 B2 * | 7/2012 | Ziaylek | A62B 25/00 224/275 |
| 9,605,798 B2 | 3/2017 | Brown et al. | |
| 10,203,065 B2 * | 2/2019 | Brown | F16M 13/02 |
| 2017/0159877 A1 | 6/2017 | Brown et al. | |
| 2017/0276405 A1 | 9/2017 | Bober | |
| 2019/0093923 A1 * | 3/2019 | Bober | F24H 9/06 |

* cited by examiner

*Primary Examiner* — Amy J. Sterling
(74) *Attorney, Agent, or Firm* — Lodestone Legal Group; Jeromye V. Sartain

(57) ABSTRACT

An expansion tank wall mount bracket apparatus capable of being mounted in multiple assembly configurations and supporting multiple expansion tanks.

21 Claims, 20 Drawing Sheets

EXPANSION TANK WALL MOUNT BRACKET APPARATUS AND METHOD OF USE

RELATED APPLICATIONS

This non-provisional patent application claims priority pursuant to 35 U.S.C. § 119(e) to and is entitled to the filing date of U.S. Provisional Patent Application Ser. No. 62/463,807 filed Feb. 27, 2017, and entitled "Expansion Tank Wall Mount Bracket." The contents of the aforementioned application is incorporated herein by reference.

BACKGROUND

The subject of this patent application relates generally to brackets, and more particularly to wall mount brackets configured for selectively mounting one or more water heater expansion tanks.

The following description includes information that may be useful in understanding the present invention. It is not an admission that any of the information provided herein is prior art or relevant to the presently claimed invention, or that any publication specifically or implicitly referenced is prior art.

Applicant(s) hereby incorporate herein by reference any and all patents and published patent applications cited or referred to in this application, to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

By way of background, residential or commercial water systems that include heated water and thus a water heater may experience thermal expansion during the heating process that can put stress on or cause damage to the plumbing components, particularly in the typical tank-style water heater context versus more recent on-demand, tankless water heater equipment. In an "open" plumbing system, thermally expanding (i.e., heated) water can push or flow back into the source water supply pipe and thus not necessarily adversely affect the downstream plumbing equipment. But often a building may have a "closed" plumbing system equipped with a one-way valve (e.g., backflow valve, check valve or pressure-reducing valve) configured to prevent heated or expanding water from backing into the supply pipe. Thus, in such a "closed" system, the increased water pressure due to thermal expansion would have nowhere to go and so could cause damage to the water heater and other plumbing equipment and potentially a safety risk as well. As such, most jurisdictions (e.g., plumbing codes) require that "closed" plumbing systems be further equipped with an expansion tank to capture or allow for the expansion of such heated water effectively without adverse consequences.

An expansion tank, sometimes referred to as a water heater expansion tank or thermal expansion tank, serves as an overflow container for excess water volume resulting from operation of the water heater or even from fluctuations in the incoming water supply pressure. Since water expands when it is heated due to thermal expansion, operation of the water heater creates extra water volume; for example, it is estimated that tap water in a standard 50-gallon water heater expands to 52 gallons when heated to 120° F. This extra water volume can again create excess pressure in the plumbing system, and if the increased pressure is sufficient and not released, over time it could cause damage to the water heater and the downstream plumbing system such as fixtures and the water pipes and connections themselves.

Accordingly, a variety of water heater expansion tanks have been developed over the years to suit various contexts, but such are generally cylindrical tanks formed of steel or the like, sized for the application. For example, a standard "small" expansion tank to suit most residential 40- or 50-gallon water heaters may be nominally rated as a 2-gallon expansion tank, which is normally sufficient in such contexts, taking the above 2-gallon volumetric expansion example as typical. Other expansion tank sizes are the "medium" that is rated as a nominal 4-gallon tank and the "large" rated as a nominal 8-gallon tank. Of course, a variety of other expansion tank sizes and configurations are possible, the foregoing being merely illustrative.

Expansion tanks are normally installed above the water heater in a substantially vertical or upright orientation, with the connection point oriented downwardly, though they may be installed in other orientations or at other angles as well. The expansion tank is typically connected to the cold water line before it enters the water heater. The most common connection is a threaded ¾ inch connection, the male connector being on the expansion tank for threadable receipt into a ¾ female "T" connector or the like installed in the water line at the desired location. Again, the foregoing is merely illustrative, as such plumbing connections can take a variety of other forms now known or later developed.

A challenge in installing such expansion tanks beyond the plumbing aspects and related connections is physically supporting or securing the expansion tank in the desired location relative to the plumbing pipes and fixtures and the water heater, with such installation needing to adequately and safely support the weight of the tank itself and any water in it (i.e., the weight of the tank empty or full). Obviously, if such mount should fail and the expansion tank shift or fall, the tank, any surrounding pipes it is connected to or otherwise, the water heater, the building structure, and/or other items or persons in the vicinity could be harmed. It is therefore desirable that the expansion tank mount be relatively easy to install, inexpensive, and functionally effective. Yet for many years such an expansion tank mount simply did not exist, and the plumbing contractor or installer or property owner was left having to field-fabricate some kind of mounting device to hang or anchor the tank, which it will be appreciated is less ideal for a number of reasons. More recently, expansion tank mounting brackets have been proposed, but each is lacking in one or more respects.

U.S. Patent Application Publication No. 2016/0047571 to Jones et al. published on Feb. 18, 2016 is entitled "Support Stand for Expansion Tank" and discloses such a support stand for an expansion tank that is mounted directly atop a hot water heater system.

In U.S. Pat. No. 9,605,798 granted on Mar. 28, 2017 to Brown et al. and assigned to Securus, Inc. and entitled "Bracket for Mounting Expansion Tanks and Other Plumbing Devices to a Building Surface," there is disclosed a system wherein an expansion tank is fastened to a support using a bracket with a U-shaped cross-section formed by a back and two sidewalls. The edges of the sidewalls each have a notch mating with a weld bead on the tank. Fasteners hold the back of the bracket to the support. First and second hose clamps pass through the sidewalls by the back to encircle the tank and clamp it to the edges of the sidewall when the hose clamps are tightened.

U.S. Patent Application Publication No. 2017/0276405 to Bober published on Sep. 28, 2017 is entitled "Apparatus for Supporting Expansion Tank" and discloses an apparatus for supporting a thermal or hydronic expansion tank relative to a hot water heater that comprises a rigid bracket adapted to be secured to the tank and to the hot water heater. The bracket provides support for the tank adjacent to the pipe nipple. Means are provided for interconnecting the tank and the bracket for securing the tank to the bracket. In one aspect, the bracket comprises a base and an end wall at each end of the base. The end walls are adapted for engaging and supporting the tank, wherein one of the end walls engages the tank adjacent the pipe nipple and the other of the end walls engages the tank past the midpoint of the length of the tank from the base.

What has been needed and heretofore unavailable is a more easy-to-use, cost-effective, and versatile or universal expansion tank wall mount bracket. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing an expansion tank wall mount bracket apparatus capable of being mounted in multiple assembly configurations and supporting multiple expansion tanks. In at least one exemplary embodiment, the apparatus comprises: a wall mount bracket having opposite wall mount bracket left and right side walls extending from a wall mount bracket body and defining therebetween a wall mount bracket inside width, the wall mount bracket being further formed having a wall mount bracket lower end wall and having at least one pair of opposing left and right slots formed in the respective wall mount bracket left and right side walls; an L bracket having opposite L bracket left and right side walls extending from an L bracket body and defining thereacross an L bracket outside width that is less than the wall mount bracket inside width, the L bracket being further formed having an L bracket lower end wall; a pin configured for selectively assembling the L bracket on the wall mount bracket as by positioning the L bracket lower end wall adjacent to the wall mount bracket lower end wall and the L bracket left and right side walls at least partially adjacent to the respective wall mount bracket left and right side walls and by passing the pin through opposite wall mount bracket left and right side wall cross-holes formed in the respective wall mount bracket left and right side walls and an intermediate L bracket lower end cross-hole formed in the L bracket left and right side walls together with the L bracket lower end wall; and an at least one adjustable strap configured for selectively passing through the at least one pair of opposing left and right slots to selectively retain the expansion tank against the wall mount bracket left and right side walls, wherein: in a first operational mode of the apparatus the L bracket is selectively assembled substantially perpendicular to the wall mount bracket as by positioning the L bracket body partially against the wall mount bracket lower end wall, whereby the expansion tank is supported on the L bracket in cooperation with the at least one adjustable strap retaining the expansion tank against the wall mount bracket; in a second operational mode of the apparatus the L bracket is selectively assembled substantially parallel to the wall mount bracket as by nesting the L bracket within the wall mount bracket with the L bracket lower end wall against the wall mount bracket lower end wall and the L bracket left and right side walls substantially adjacent to the respective wall mount bracket left and right side walls, whereby the expansion tank is supported on the wall mount bracket in cooperation with the at least one adjustable strap retaining the expansion tank against one or more of the wall mount bracket and the L bracket; and in a third operational mode of the apparatus the wall mount bracket and the L bracket are unassembled and separately employed in conjunction with multiple adjustable straps, whereby multiple expansion tanks are supported, one on the wall mount bracket and one on the L bracket.

Other objects, features, and advantages of aspects of the present invention will become more apparent from the following detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

Figure 1:
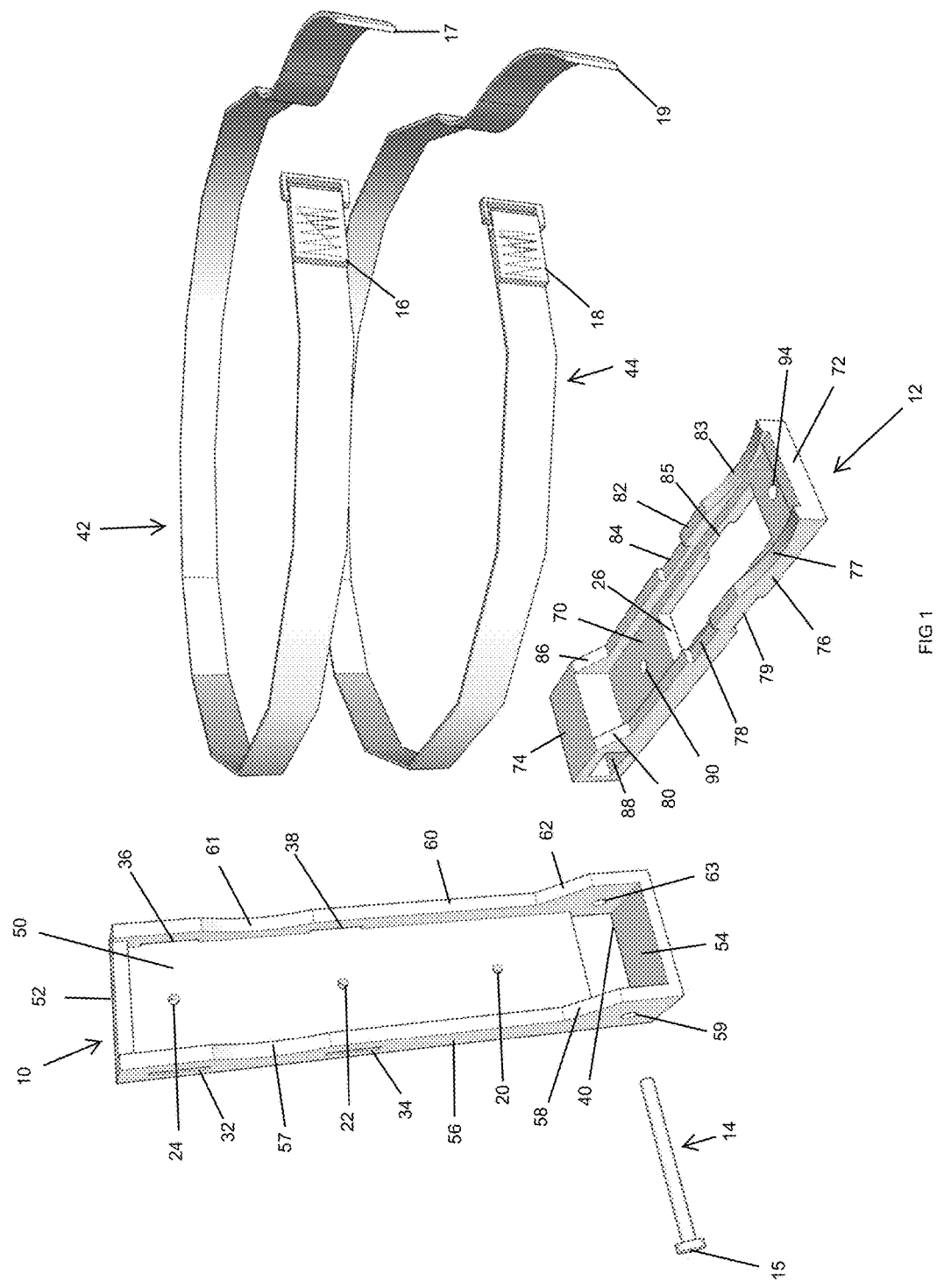
FIG. 1 is an exploded perspective view of an exemplary expansion tank wall mount bracket apparatus in a first operational mode, in accordance with at least one embodiment.
Figure 2:
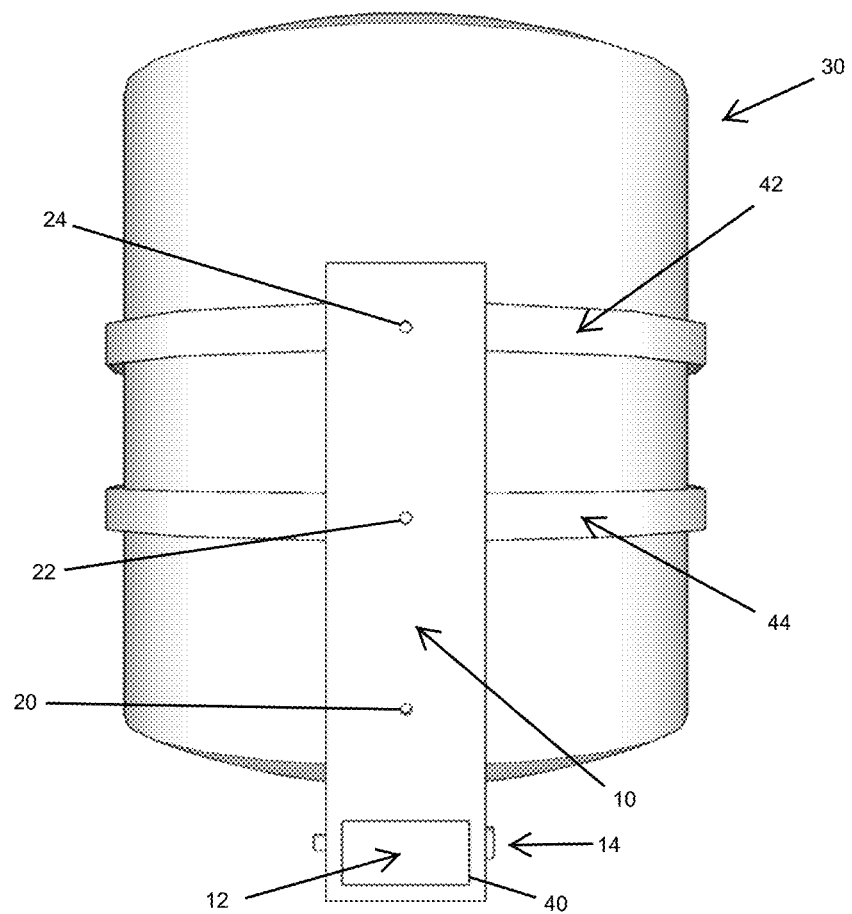
FIG. 2 is a reduced-scale rear perspective view thereof in the first operational mode, in accordance with at least one embodiment.
Figure 3:
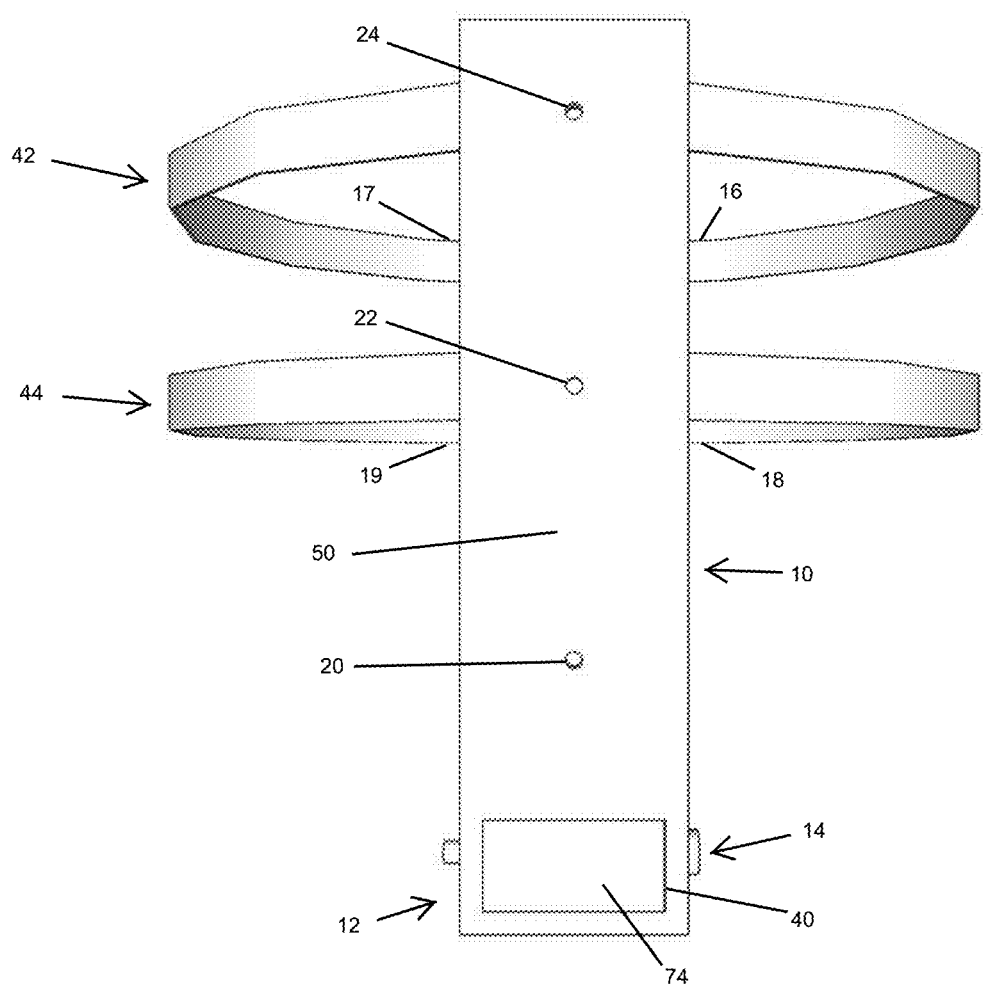
FIG. 3 is an enlarged rear perspective view thereof in the first operational mode, with the expansion tank removed for simplicity, in accordance with at least one embodiment.

The above described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments. More generally, those skilled in the art will appreciate that the drawings are schematic in nature and are not to be taken literally or to scale in terms of material configurations, sizes, thicknesses, and other attributes of an apparatus according to aspects of the present invention and its components or features unless specifically set forth herein.

DETAILED DESCRIPTION

The following discussion provides many exemplary embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

While the inventive subject matter is susceptible of various modifications and alternative embodiments, certain illustrated embodiments thereof are shown in the drawings and will be described below in detail. It should be understood, however, that there is no intention to limit the invention to any specific form disclosed, but on the contrary, the inventive subject matter is to cover all modifications, alternative embodiments, and equivalents falling within the scope of the claims.

Turning first to FIG. 1, there is shown an exploded perspective view of an exemplary embodiment of an expansion tank wall mount bracket apparatus according to aspects of the present invention. The apparatus generally comprises, in the exemplary embodiment, five components: the wall mount bracket 10; the L bracket 12 that may be operably engaged with the wall mount bracket 10 or used independently thereof; the pin 14 for selectively operably engaging the wall mount and L brackets 10, 12 together; and the two adjustable straps 42, 44 for selectively mounting an expansion tank 30 on one or both of the wall mount and L brackets 10, 12. The straps 42, 44 may comprises further components as herein illustrated, depending on their means of attachment and/or adjustment, and one or both of the wall mount and L brackets 10, 12 may be affixed to or mounted on a wall or other structure or surface using any appropriate fasteners (not shown), but the five core components as set forth above and described in further detail below in connection with the figures together define a wall mount bracket apparatus illustrating aspects of the present invention that may be employed in at least three operational modes in relatively easily and effectively securing or mounting one or more water heater expansion tanks 30, it being appreciated that any such expansion tanks 30 can be configured in any manner now known or later developed in the art and that the present invention does not include such third-party expansion tanks 30 and is not so limited, the illustration of any expansion tanks 30 being simply for context in describing the operation and use of the exemplary expansion tank wall mount bracket apparatus. More generally, it will be further appreciated that while a particular configuration of an expansion tank wall mount bracket apparatus according to aspects of the present invention is shown and described, again in three exemplary operational modes, the invention is not so limited and may take a number of further forms or configurations and related uses consistent with the present disclosure without departing from the spirit and scope of the invention, such that the exemplary embodiment and operational modes shown and described are to be understood as illustrative and non-limiting. Accordingly, an expansion tank wall mount bracket apparatus according to aspects of the present invention may contain greater or fewer components than the illustrated five components, for example, with each such component again able to take other forms as well. In the exemplary embodiment shown, FIGS. 1-15 illustrate in various views an expansion tank wall mount bracket apparatus according to aspects of the present invention in a first operational mode in which the L bracket 12 is installed so as to extend laterally from the wall mount bracket 10, or substantially perpendicular thereto in the exemplary embodiment, the expansion tank 30 then being seated on and supported vertically by the outwardly-extending L bracket 12 in cooperation with the one or more straps 42, 44 that substantially secure the tank 30 against the wall mount bracket 10, further supporting the tank 30 and maintaining its position on the assembled L bracket 12. As discussed further below in connection with FIGS. 16-18, the L bracket 12 in some applications may not be employed in vertically supporting an expansion tank 30 from beneath, but may instead in an alternative second operational mode be nested within the wall mount bracket 10 to provide further structural rigidity or support thereto and/or just to conveniently store the L bracket 12 until such time as it is needed in another operational mode of the apparatus, and as shown and described below in connection with FIGS. 19 and 20, in a third operational mode the wall mount and L brackets 10, 12 may not be assembled at all but may instead both be installed on a wall or other support structure vertically so as to each separately mount an expansion tank 30 employing one or more straps 42, 44, again, more about which is said below.

With continued reference to FIG. 1, the various components of the exemplary expansion tank wall mount bracket apparatus according to aspects of the present invention are shown and now described in greater detail. First, the main wall mount bracket 10 generally comprises a wall mount bracket body 50 that defines a backplate or mounting plate for the bracket 10 for selective attachment to a wall or other support structure (not shown), such body 50 being formed in the exemplary embodiment with three mounting holes: a bottom screw hole 20; a middle screw hole 22; and a top screw hole 24. Of course, it will be appreciated that other hole arrangements and more generally other fastening means now known or later developed may be employed. But in the exemplary embodiment, at least one of the mounting holes 20, 22, 24 would be employed, more preferably two of the holes 20, 22, 24, and most preferably all three of the holes 20, 22, 24 as by passing a screw or other such threaded fastener through a select one or more of the holes 20, 22, 24 and then threadably engaging such fastener(s) with the underlying wall or support structure in a manner generally known and used in the art. The wall mount bracket 10 is further shown as being formed having opposite end and side walls 52, 54, 56, 60 that are installed on or integral with and form somewhat of a border about the perimeter of the wall mount bracket body 50. In the exemplary embodiment, the four walls 52, 54, 56, 60 are interconnected in a somewhat rectangular profile corresponding to the body 50 and being substantially perpendicular thereto, the walls 52, 54, 56, 60 projecting or extending in a common direction away from the body 50 so as to then form a somewhat hollowed out, rectangular receptacle region bounded by the walls 52, 54, 56, 60 laterally and the body 50 inwardly, with the exception of a lower wall mount bracket cut-out 40 adjacent to the lower end wall 54, more about which is said below. It will be appreciated with reference particularly to FIGS. 16 and 17 as discussed further below in the context of an optional second operational mode of the apparatus, and a configuration of the apparatus convenient for packaging and thus shipping and storage, that the rectangular receptacle region bounded by the walls 52, 54, 56, 60 and body 50 of the wall mount bracket 10 is advantageously sized and configured to selectively receive or nest the L bracket 12 therein, whether during packaging and shipment or use. Furthermore, at least one pair of opposed slots 32, 34, 36, 38 may be formed in the opposite side walls 56, 60 for selective receipt of the one or more adjustable straps 42, 44. In the exemplary embodiment as shown, an upper pair of opposed slots 32, 36 are formed in the respective left and right side walls 56, 60 nearer to the wall mount bracket upper end wall 52 for selective receipt of the upper adjustable strap 42 and a lower pair of opposed slots 34, 38 are formed in the respective left and right side walls 56, 60 at an intermediate location for selective receipt of the lower adjustable strap 44, more about which is said below. The opposite side walls 56, 60 are further formed having opposite outwardly-facing left and right side wall recesses 57, 61 and with opposite upwardly- and outwardly-facing left and right side wall shoulders 58, 62, which features cooperate in allowing a variety of expansion tanks 30 to be mounted on the apparatus in use, once more, as described herein. Finally, the opposite side walls 56, 60 are formed having opposite left and right side wall cross-holes 59, 63 configured to receive the pin 14 for selectively operably engaging the wall mount and L brackets 10, 12 together. Those skilled in the art will again appreciate that while a particular configuration of the wall mount bracket 10 is shown and described the invention is not so limited.

Figure 9:
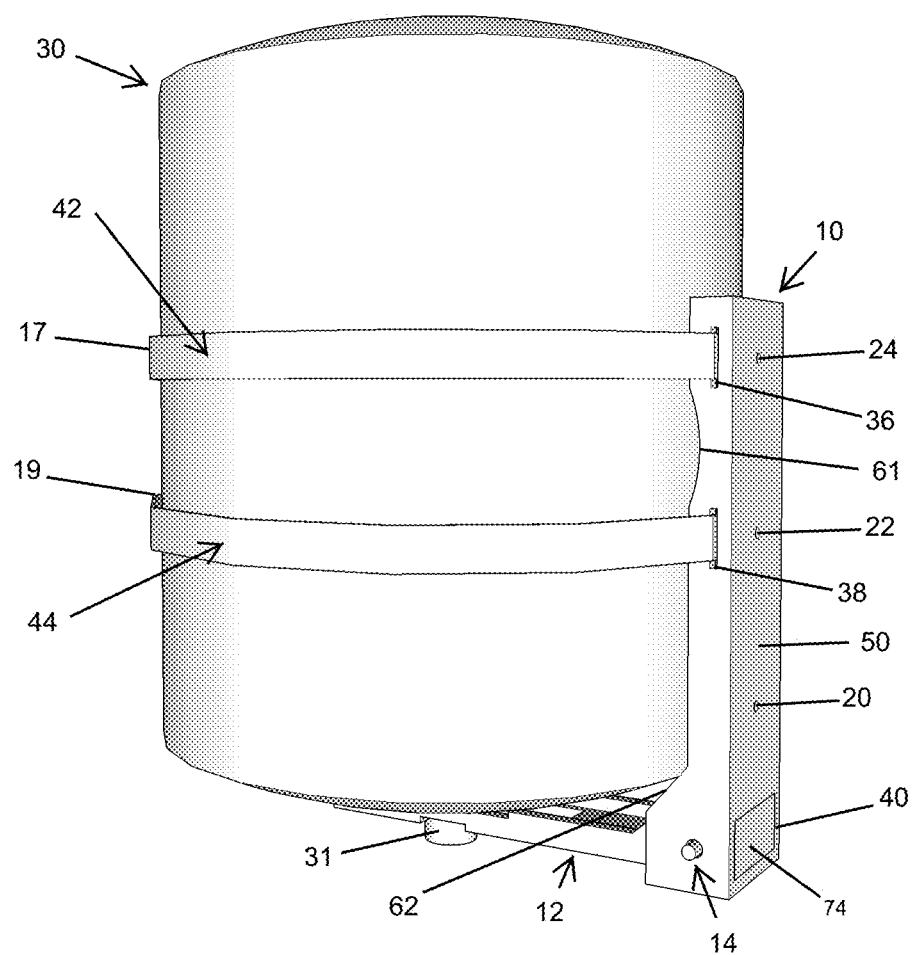
FIG. 9 is a right perspective view thereof in the first operational mode, in accordance with at least one embodiment.
Figure 10:
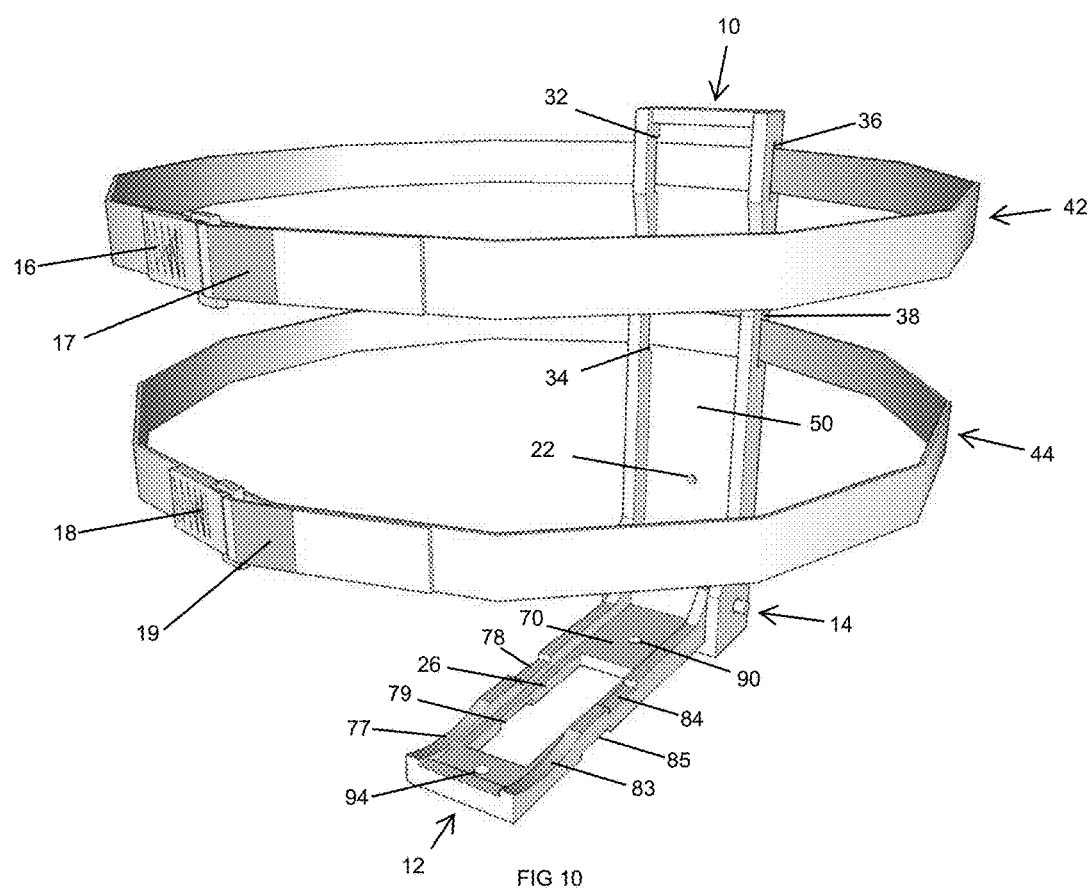
FIG. 10 is a further perspective view thereof in the first operational mode, with the expansion tank removed for simplicity, in accordance with at least one embodiment.
Figure 11:
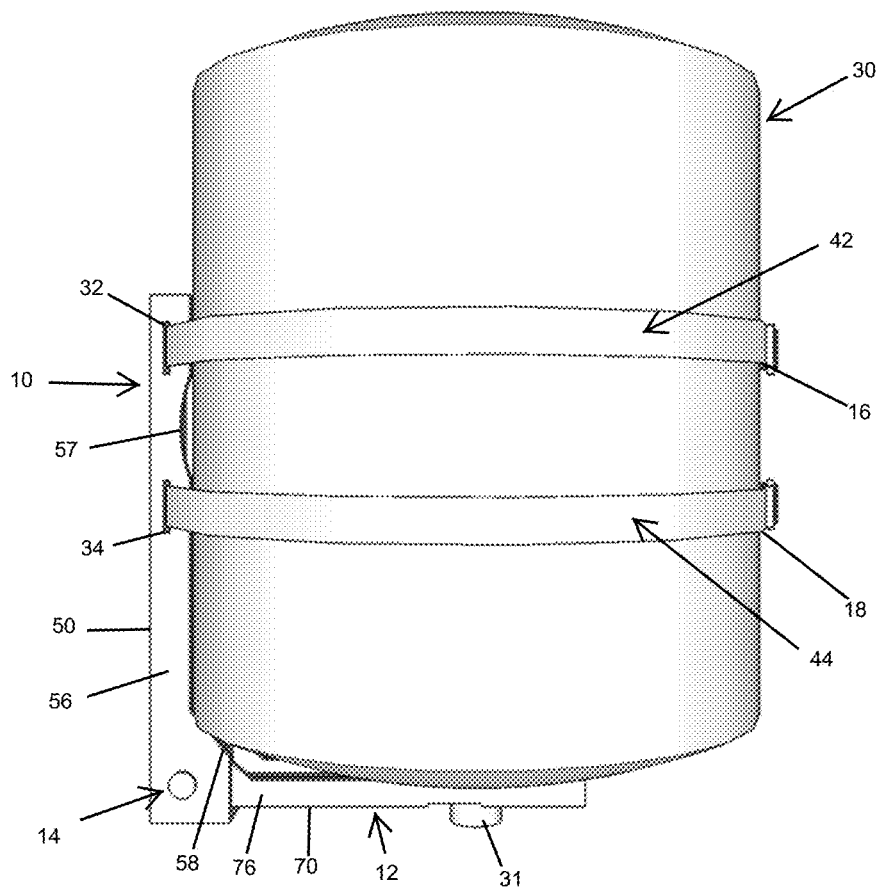
FIG. 11 is a left perspective view thereof in the first operational mode, in accordance with at least one embodiment.
Figure 12:
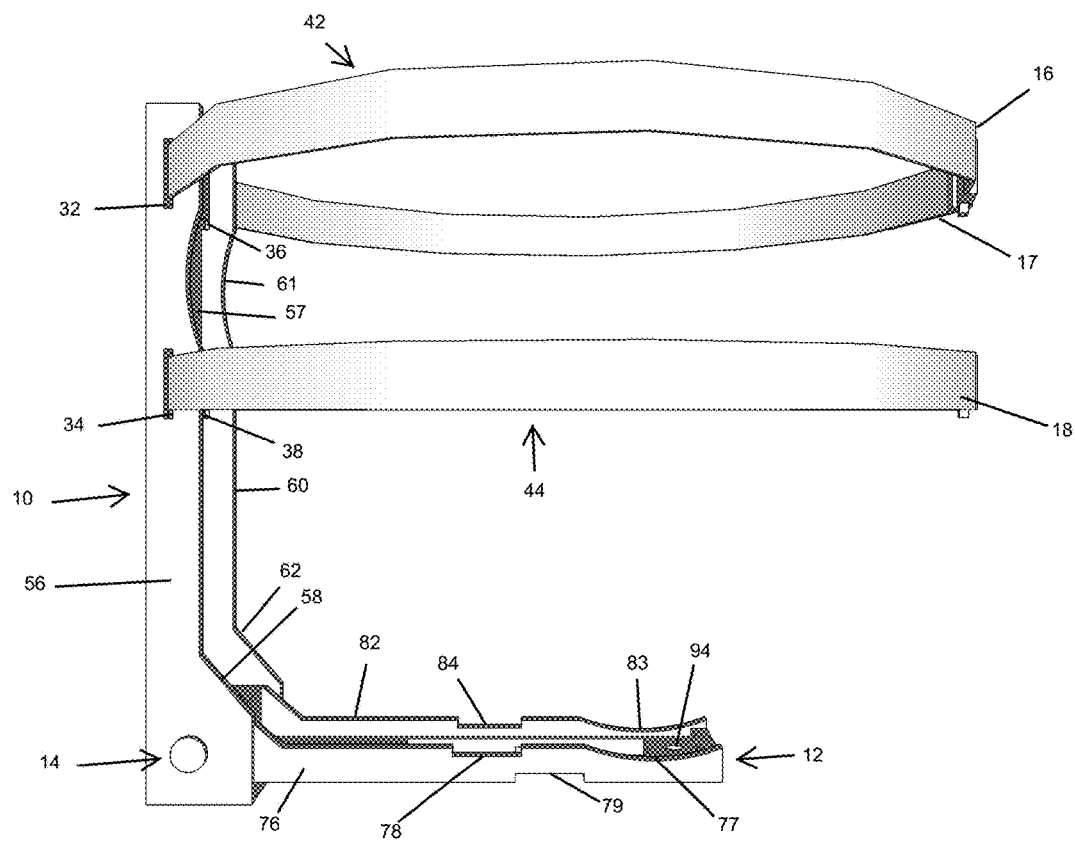
FIG. 12 is an enlarged left perspective view thereof in the first operational mode, with the expansion tank removed for simplicity, in accordance with at least one embodiment.
Figure 13:
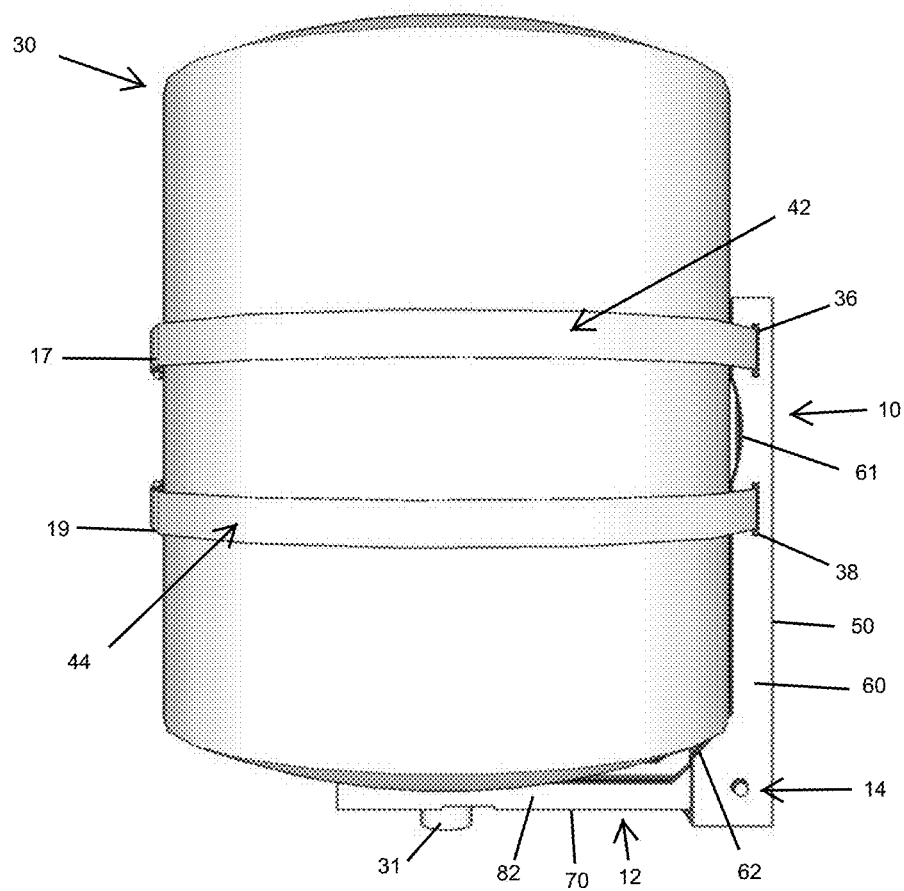
FIG. 13 is a further right perspective view thereof in the first operational mode, in accordance with at least one embodiment.
Figure 14:
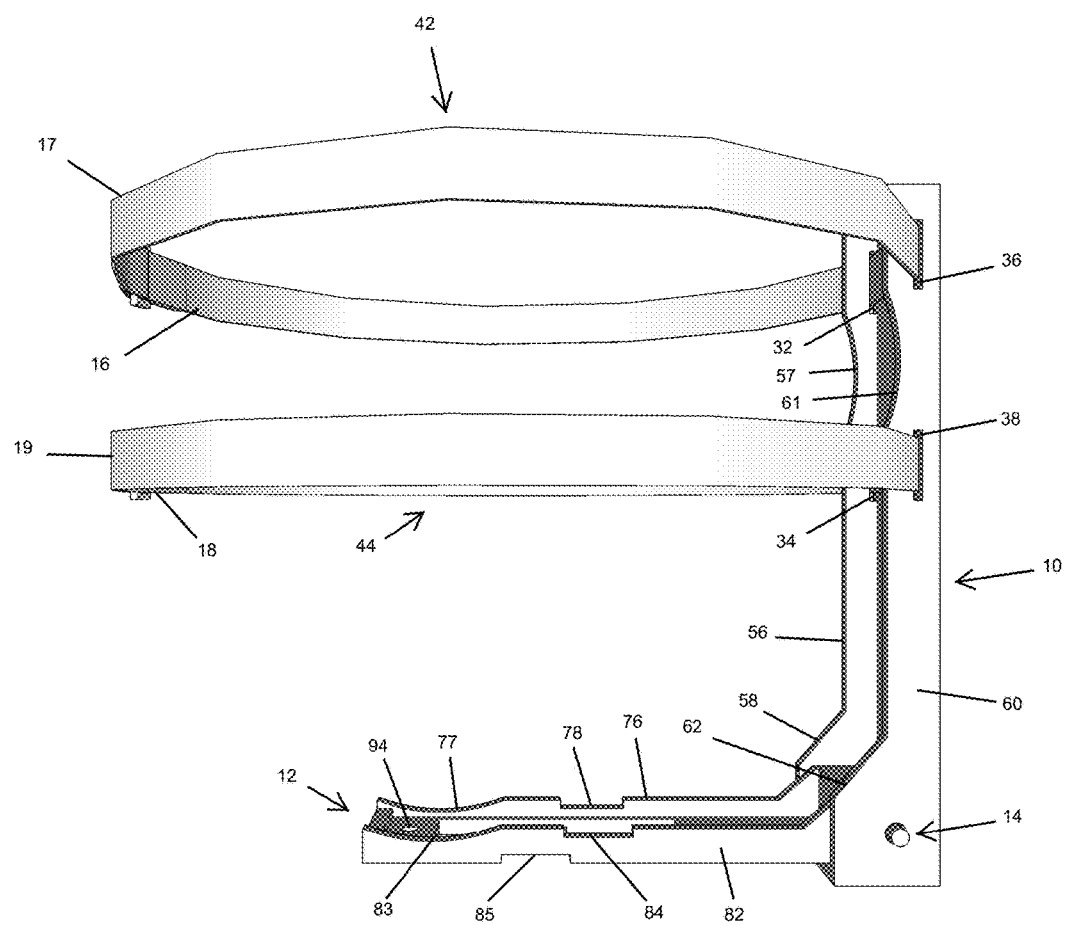
FIG. 14 is an enlarged right perspective view thereof in the first operational mode, with the expansion tank removed for simplicity, in accordance with at least one embodiment.
Figure 15:
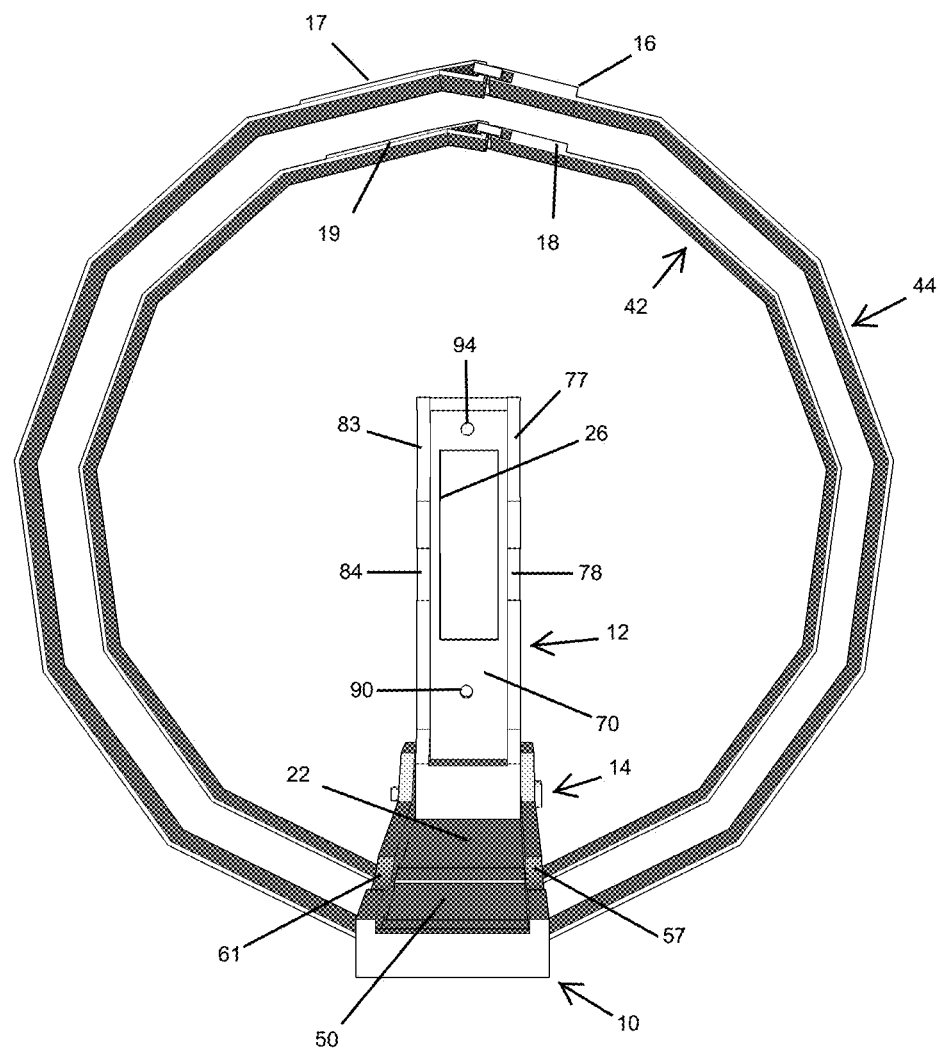
FIG. 15 is a top perspective view thereof in the first operational mode, with the expansion tank removed for simplicity, in accordance with at least one embodiment.

Still with reference to FIG. 1, the L bracket 12 is shown spatially in the exploded perspective view oriented substantially perpendicular to the main wall mount bracket 10 as it would be installed in the exemplary first operational mode wherein the two brackets 10, 12 together form a somewhat "L" profile or assembly for supporting or securing an expansion tank 30, as best seen in FIGS. 9, 11 and 13, discussed further below. Somewhat analogous to the main wall mount bracket 10, the L bracket 12 generally comprises an L bracket body 70 that defines a backplate for the bracket 10 for added structural integrity in the aforementioned first operational mode of the apparatus wherein the wall mount and L brackets 10, 12 are assembled in a somewhat "L" or right angle arrangement or for selective attachment to a wall or other support structure (not shown) as in the exemplary third operational mode of the apparatus as described herein in connection with FIGS. 19 and 20, the bracket 12 further shown as being formed having opposite end and side walls 72, 74, 76, 82 that are installed on or integral with and form somewhat of a border about the perimeter of the L bracket body 70. In the exemplary embodiment, the four walls 72, 74, 76, 82 are interconnected in a somewhat rectangular profile corresponding to the body 70, and hence the main bracket 10, and are substantially perpendicular thereto, with an L bracket cut-out 26 formed at an intermediate location along the L bracket body 70 for clearance relative to or removable passage therethrough of the nipple or connector 31 of the expansion tank 30, again, as in use in the exemplary first operational mode of the apparatus generally illustrated in FIGS. 1-15. The exemplary L bracket body 70 is further formed with two mounting holes: a bottom screw hole 90 closer to the L bracket lower end wall 74; and a top screw hole 94 closer to the L bracket upper end wall 72, with the L bracket cut-out 26 in between. Of course, it will be appreciated that other hole arrangements and more generally other fastening means now known or later developed may be employed. But in the exemplary embodiment in connection with the alternative exemplary third operation mode illustrated in FIGS. 19 and 20, at least one of the mounting holes 90, 94 would be employed, more preferably both of the holes 90, 94, as by passing a screw or other such threaded fastener through a select one or more of the holes 90, 94 and then threadably engaging such fastener(s) with the underlying wall or support structure in a manner generally known and used in the art. It will again be appreciated with reference particularly to FIGS. 16 and 17 as discussed further below in the context of the optional exemplary second operational mode of the apparatus, and a configuration of the apparatus convenient for packaging and thus shipping and storage, that the rectangular profile of the L bracket body 70 defined by the end and side walls 72, 74, 76, 82 may be so sized and configured to substantially conform to or nest within the rectangular receptacle region bounded by the walls 52, 54, 56, 60 and body 50 of the wall mount bracket 10, again whether during packaging and shipment or use. Furthermore, at least one pair of opposed, inwardly-facing or -opening left and right L bracket side wall bottom notches 79, 85 may be formed in the opposite side walls 76, 82 for selective receipt of the one or more adjustable straps 42, 44. In the exemplary embodiment as shown, a single pair of opposed bottom notches 79, 85 is formed in the respective left and right side walls 76, 82 at an intermediate location, though nearer to the L bracket upper end wall 72, for selective receipt of the adjustable strap 42, more about which is said below. The opposite side walls 76, 82 are further formed having opposite and upwardly-facing left and right side wall recesses 77, 83 and with opposite and upwardly-facing or -opening left and right L bracket side wall top notches 78, 84 and opposite upwardly- and outwardly-facing left and right L bracket side wall shoulders 80, 86, which features cooperate in allowing a variety of expansion tanks 30 to be mounted on the apparatus in use, once more, as described herein. Finally, the opposite side walls 76, 82 are formed in cooperation with the relatively thicker L bracket lower end wall 74 as having a single transverse lower end cross-hole 88 configured to allow clearance for or passage therethrough of the pin 14 for selectively operably engaging the wall mount and L brackets 10, 12 together. Those skilled in the art will again appreciate that while a particular configuration of the L mount bracket 12 is shown and described the invention is not so limited, the L bracket 12 able to take a number of other configurations, whether based on changes to the main wall mount bracket 10 or otherwise without departing from the spirit and scope of the invention.

Figure 5:
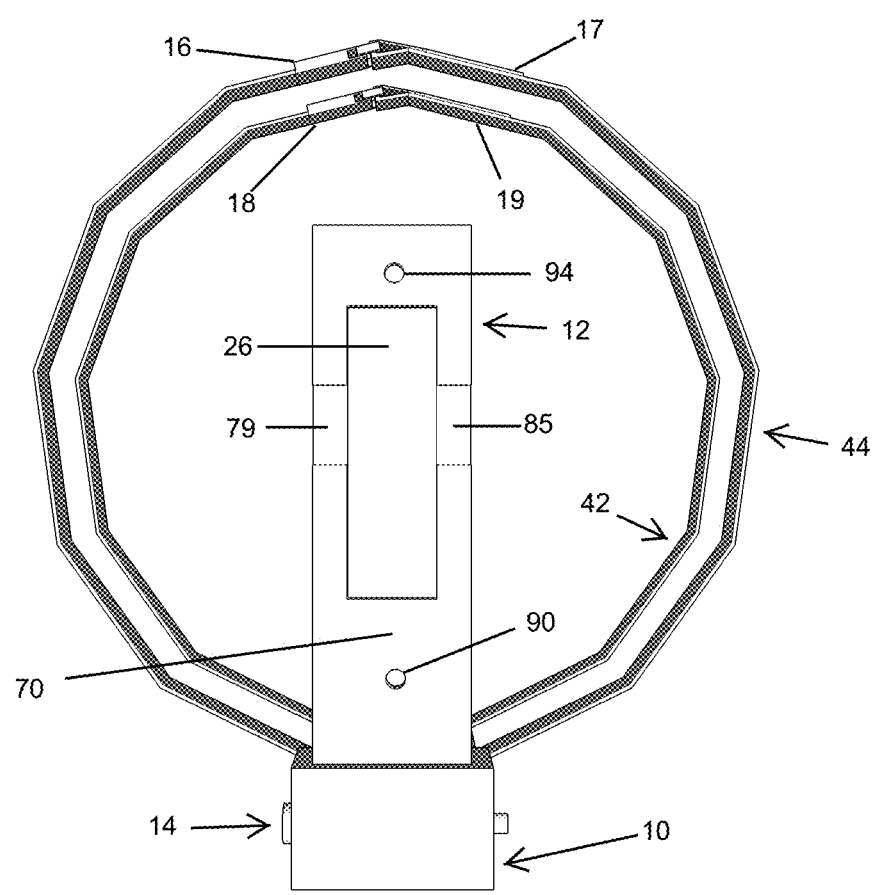
FIG. 5 is a further bottom perspective view thereof in the first operational mode, with the expansion tank removed for simplicity, in accordance with at least one embodiment.
Figure 6:
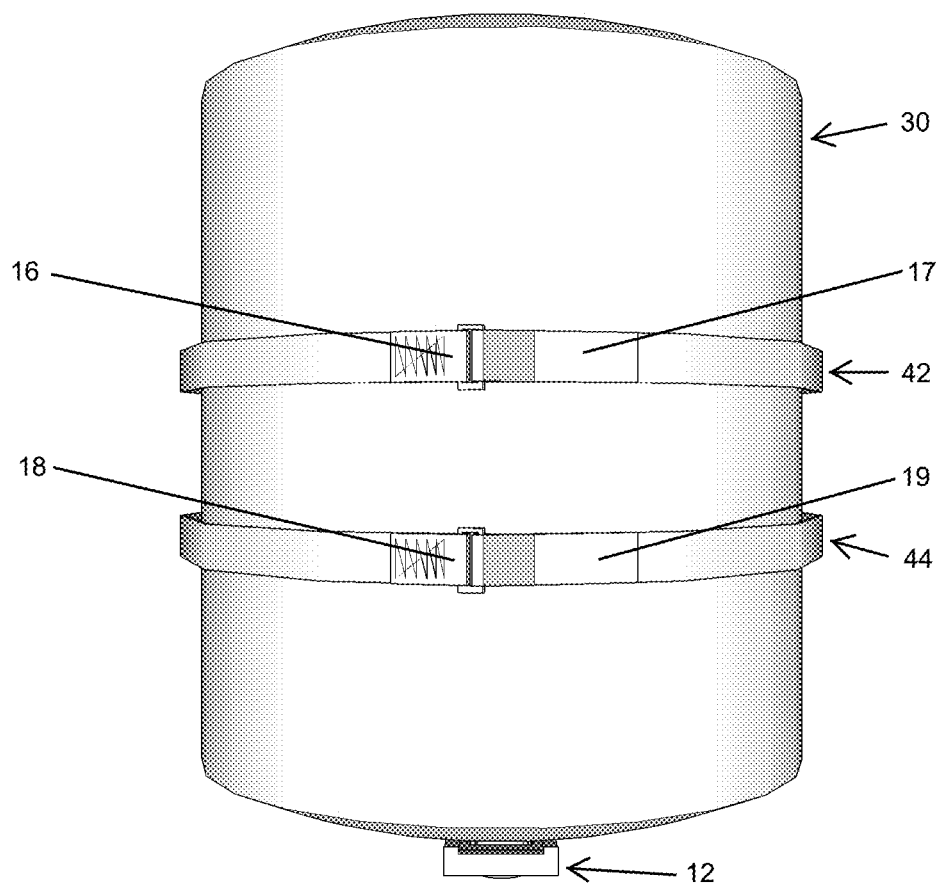
FIG. 6 is a front perspective view thereof in the first operational mode, in accordance with at least one embodiment.
Figure 7:
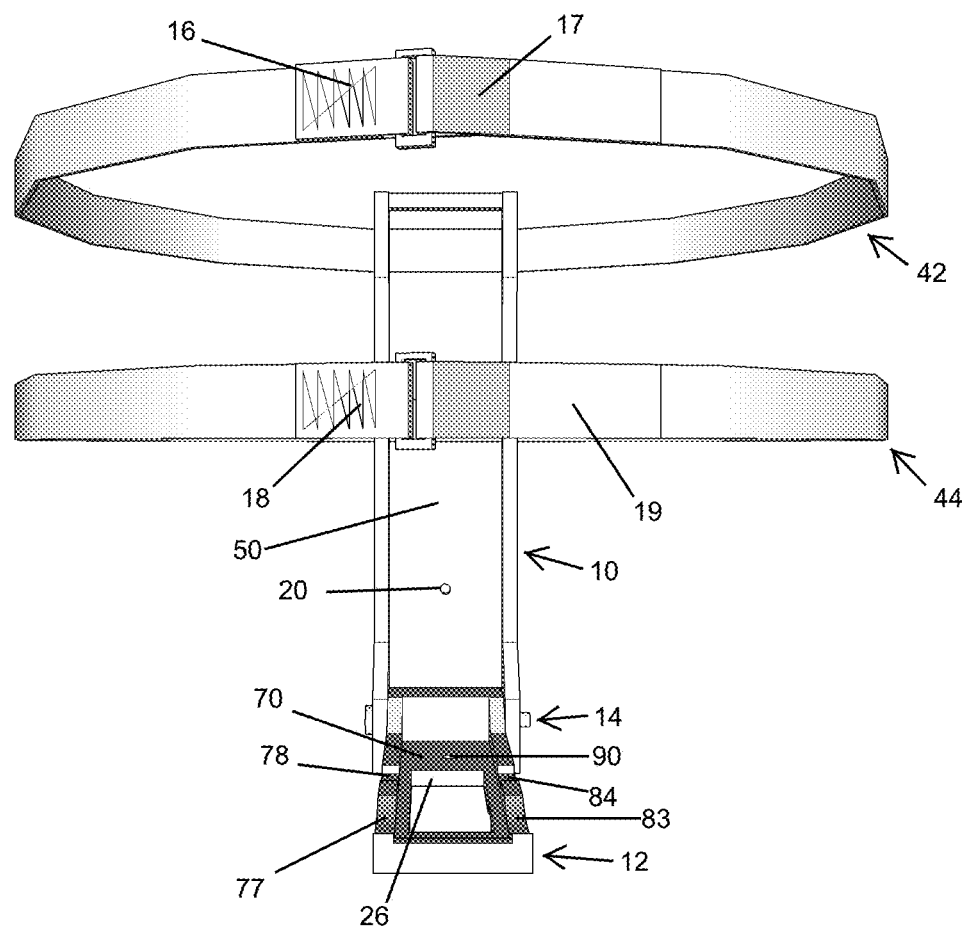
FIG. 7 is an enlarged front perspective view thereof in the first operational mode, with the expansion tank removed for simplicity, in accordance with at least one embodiment.
Figure 8:
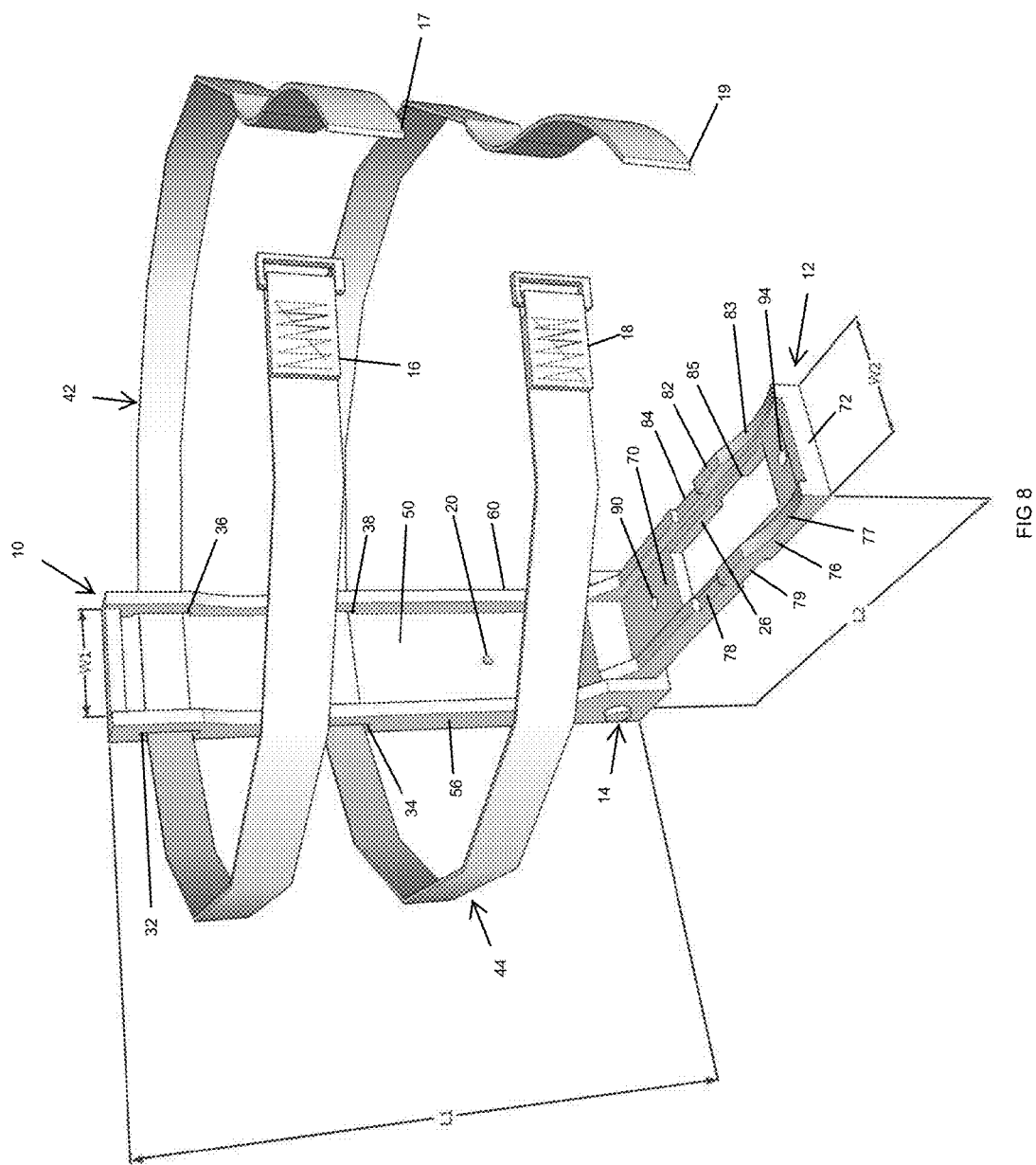
FIG. 8 is an enlarged further perspective view thereof in the first operational mode, with the expansion tank removed for simplicity, in accordance with at least one embodiment.

Referring still to the exploded perspective view of the exemplary expansion tank wall mount bracket apparatus according to aspects of the present invention of FIG. 1, it can be seen that an illustrated pin 14 is shown as again selectively operably engaging and assembling the wall mount and L brackets 10, 12 together, here as by passing through the wall mount bracket left side wall cross-hole 59, the lower end cross-hole 88 of the L bracket 12, and then the wall mount bracket right side wall cross-hole 63, as when the L bracket 12 is positioned in the main wall mount bracket 10 with the L bracket lower end wall 74 substantially adjacent to the wall mount bracket lower end wall 54 as in the first and second exemplary operational modes shown and described herein, with the opposite wall mount bracket left and right side wall cross-holes 59, 63 substantially aligned with the L bracket lower end cross-hole 88 for receipt therethrough of the pin 14. While such pin 14 is shown as being annular and unthreaded, as might be retained by interference or by a clip, cotter pin, or the like (not shown) installed through the end of the pin 14 opposite the head 15, those skilled in the art will appreciate that any appropriate fastener or coupling, now known or later developed, and whether threaded or unthreaded, and if threaded whether engaging a threaded cross-hole 59, 63 or secured via a nut (not shown), and of any appropriate geometry, including square or other polygon cross-section for keying the pin 14 relative to one or more similarly-configured cross-holes 59, 63, 88 in the wall mount and/or L brackets 10, 12, may be employed according to aspects of the present invention without departing from its spirit and scope. The exemplary upper and lower straps 42, 44 may be formed of any appropriate configuration and material, now known or later developed, for selectively retaining an expansion tank 30 of effectively any size ever used in the art, the straps 42, 44 and the overall apparatus simply being scalable accordingly. It will be appreciated by those skilled in the art that the straps 42, 44 may be particularly configured having a profile or cross-section suitable for removable or selective passage through the slots 32, 34, 36, 38 formed in the wall mount bracket 10 and/or the notches 79, 85 formed in the L bracket 12 during use and having a length sufficient to pass about the perimeter or circumference of any expansion tank 30 then installed on the apparatus as shown and described herein and thus affixed in such position. In the exploded and unassembled view of FIG. 1, the straps 42, 44 are shown with their respective free ends 17, 19 not engaged with the D-ring ends 16, 18, whereas in use, as best seen in FIGS. 5-7, among other views, the free or adjustable ends 17, 19 of the respective upper and lower straps 42, 44 may be selectively passed through the respective D-ring ends 16, 18 thereof, with the free ends 16, 18 then being doubled back and secured to the bodies of the straps 42, 44 as by Velcro® hook-and-loop-type fasteners or any other removable or temporary such fastening means now known or later developed in the art. It is noted once more at this juncture that the drawings are schematic in nature and so are not to be taken literally or to scale and, specifically, the upper and lower straps 42, 44 though shown as seeming to have linear sections or bends, the straps 42, 44 need not be and likely are not so in practice, whether made of a textile or webbing material or other such woven material or an extruded material such as plastic or metal or other synthetic material, or any combination thereof, again, whether now known or later developed. As such, those skilled in the art will appreciate that the exemplary upper and lower adjustable straps 42, 44 are merely illustrative of features and aspects of the present invention and non-limiting.

Figure 16:
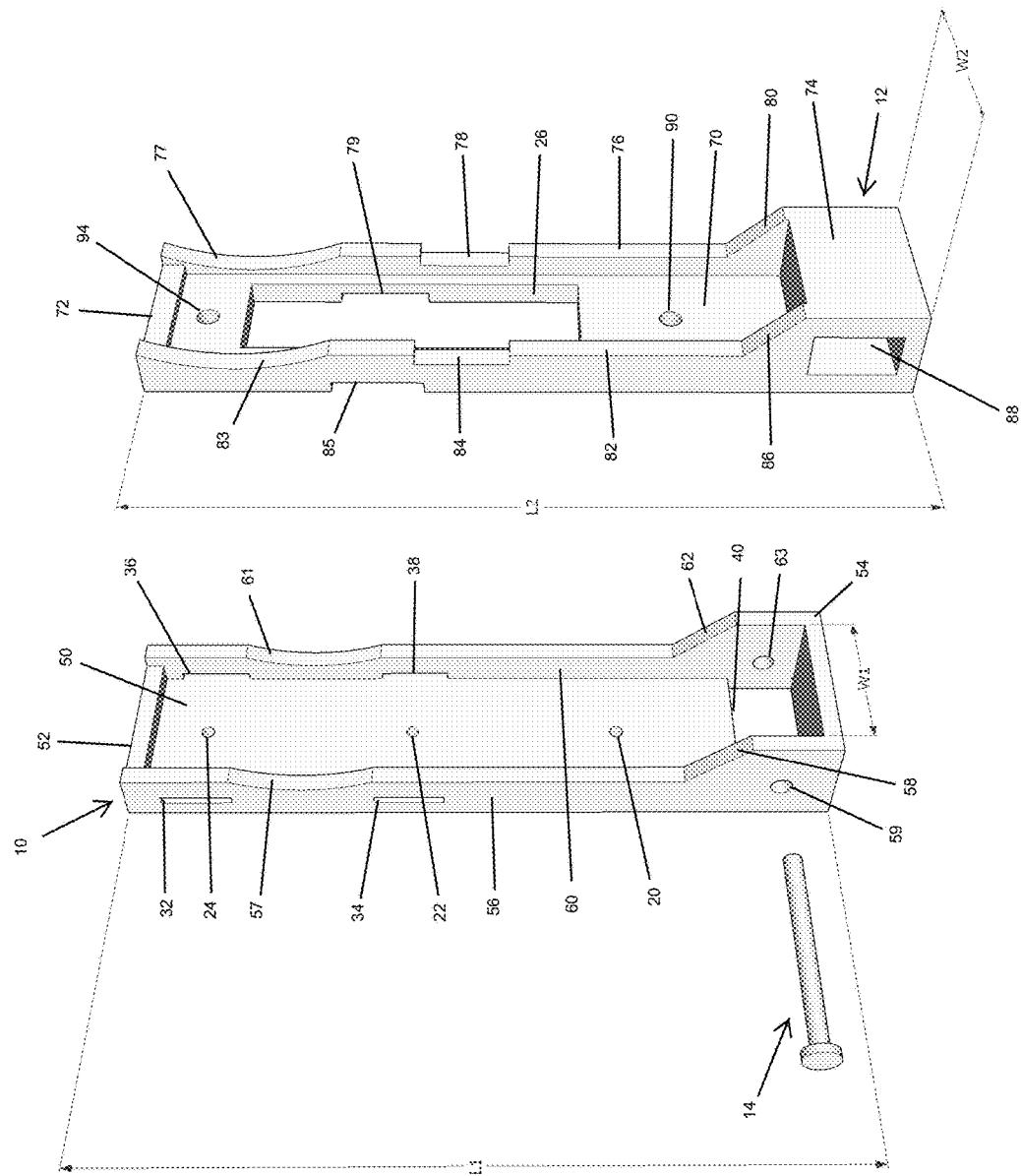
FIG. 16 is an exploded perspective view thereof in a second operational mode, with the adjustable straps removed for simplicity, in accordance with at least one embodiment.
Figure 17:
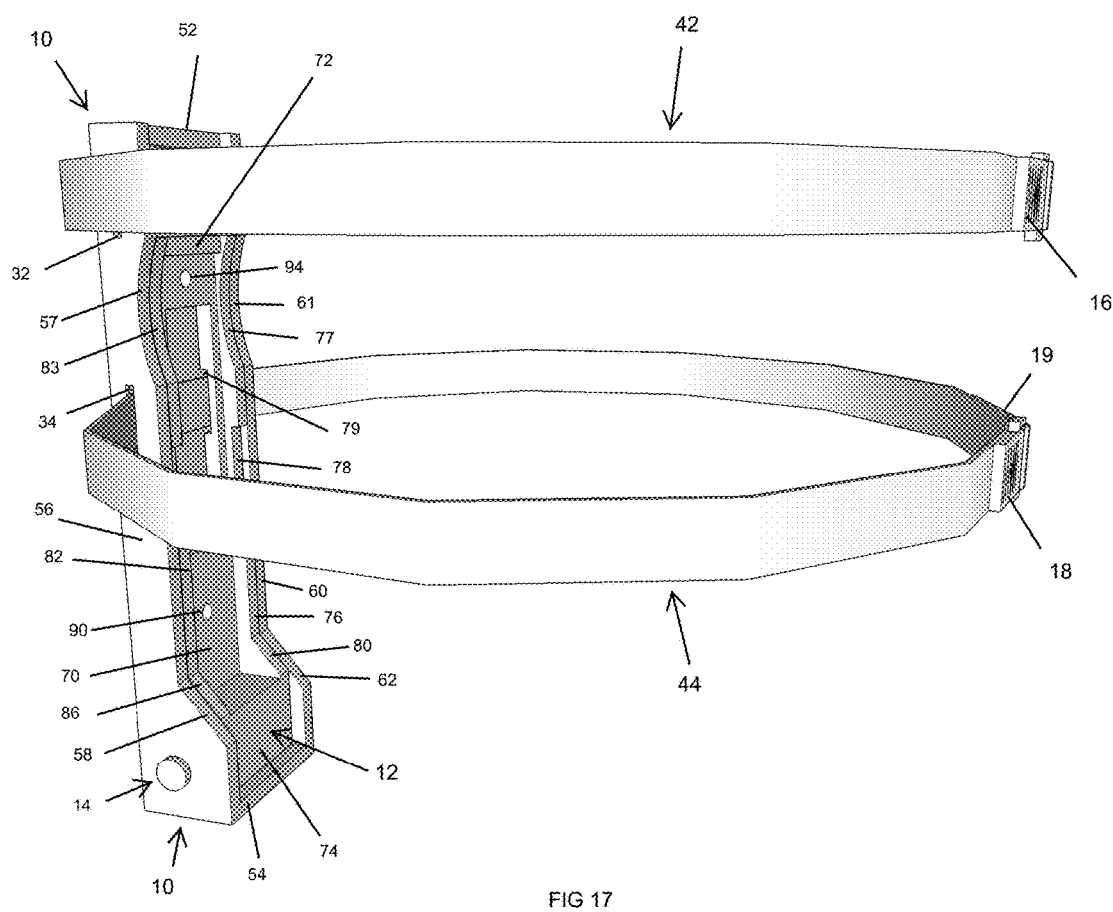
FIG. 17 is an enlarged left perspective view thereof in the second operational mode, with the expansion tank removed for simplicity, in accordance with at least one embodiment.
Figure 18:
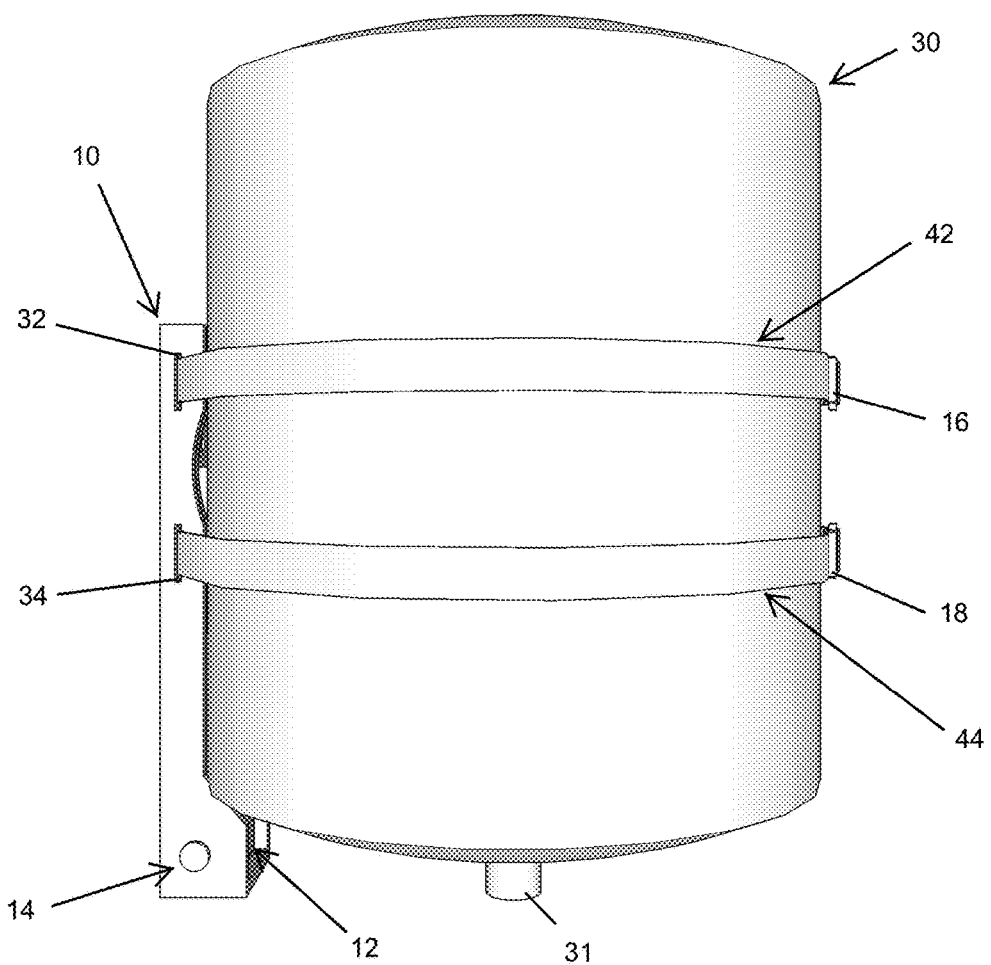
FIG. 18 is a further left perspective view thereof in the second operational mode, in accordance with at least one embodiment.

More generally, in connection with all of the various components of an expansion tank wall mount bracket apparatus according to aspects of the present invention, and particularly the wall mount and L brackets 10, 12, it will be appreciated that any appropriate materials and methods of construction now known or later developed may be employed, including but not limited to metals such as steel, aluminum, alloys, and the like and a variety of plastics such as polypropylene, polystyrene, polyvinyl chloride ("PVC"), acrylonitrile butadiene styrene ("ABS"), polyethylenes such as high density polyethylene ("HDPE") and low density polyethylene ("LDPE"), polycarbonate, polyurethane, and other such plastics, thermoplastics, thermosetting polymers, and the like, any such components being fabricated or formed as through injection molding, casting, extrusion, machining, stamping, forming, or any other such technique now known or later developed. Relatedly, such components may be formed integrally or of a substantially uniform or singular structure or may be formed of two or more separate components and then assembled in any appropriate secondary operation employing any assembly technique now known or later developed, including but not limited to fastening, bonding, welding, over-molding or coining, press-fitting, snapping, stitching, or any other such technique now known or later developed. Those skilled in the art will fundamentally appreciate that any such materials and methods of construction are encompassed within the scope of the invention, any exemplary materials and methods in connection with any and all embodiments thus being illustrative and non-limiting. Dimensionally, the overall size and scale or proportionality of any such expansion tank wall mount bracket apparatus according to aspects of the present invention may vary widely based on a number of factors and contexts—in the present exemplary assembly of the nesting wall mount and L brackets 10, 12, an objective is that such resulting apparatus would generally accommodate a range of water heater expansion tanks 30 currently on the market nominally in the range of two to eight gallons, sometimes being rated, for example, as 2-gallon ("small"), 4-gallon ("medium"), and 8-gallon ("large") tanks, though it will again be appreciated that such is merely illustrative. In such a typical range or line-up of expansion tanks 30, the overall size of the tank 30 may be in a range from roughly seven to twelve inches (7-12 in.) in diameter and from roughly ten to twenty-two inches (10-22 in.) in height, though again other sizes and shapes or configurations are possible according to aspects of the present invention; in most contexts, especially in the "small" and "medium" sized tanks that are more typically employed in residential and small commercial contexts, the nominal tank diameter is in the range of eight to eleven inches (8-11 in.) and the nominal tank height is in the range of ten to fourteen inches (10-14 in.), with even the "large" sized tank often having the same nominal diameter as the "medium" sized tank and just made taller to accommodate the additional volume. Taking the exemplary diameter ranges noted, it will be appreciated that the nominal circumference range of such tanks is twenty-two to thirty-eight inches (22-38 in.), though again more typically in the range of twenty-five to thirty-five inches (25-35 in.), such that the tightened or fastened nominal lengths of the expansion tank adjustable straps 42, 44 would also be in such ranges. As such, accounting for the exemplary Velcro® strap configuration wherein the adjustable free ends 17, 19 loop through the D-ring ends 16, 18 and then fold back along the strap body to fasten, it will be appreciated that the strap length from the end 17, 19 to end 16, 18 would be in the range of twenty-five to forty-one inches (25-41 in.), for example, accounting for the full exemplary range of tank diameters and allowing for a roughly three inch (3 in.) minimal strap overlap when tightening and fastening down. Accordingly, it will be further appreciated that so long as the straps are at least about forty inches (40 in.) long and configured with sufficient hook-and-loop Velcro® swatches at the adjustable free ends 17, 19 of the straps 42, 44, such would thereby accommodate effectively the full range of the noted water heater expansion tanks 30, though again those skilled in the art will appreciate that other dimensions may be employed to suit a particular context, and specifically that a range of sizes of the straps 42, 44 may be provided to suit various tank applications, versus a "one size fits all" strap. The widths of the straps 42, 44 and thus of the respective wall mount bracket slots 32, 34, 36, 38 and the L bracket bottom notches 79, 85 through which the straps 42, 44 are selectively inserted during use may of course vary widely, but in the exemplary embodiment would be in the range of one-half inch to two inches (0.5-2 in.), or nominally one inch (1 in.) in one example. The placement of the slots 32, 34, 36, 38 and notches 79, 85 along the respective wall mount and L bracket left and right side walls 56, 60, 76, 82 may also vary widely, though it will be appreciated that it is generally desirable to have at least one strap 42, 44 located along the mounted expansion tank 30 somewhat at or above the midway point of the height of the tank 30 for stability. In terms of the overall dimensions of the wall mount and L brackets 10, 12, then, the main wall mount bracket 10 may have nominal outside dimensions of roughly eight to twelve inches (8-12 in.) in length and roughly two to three inches (2-3 in.) in width. By way of illustration and not limitation, the overall height or length L1 (FIG. 16) of the wall mount bracket 10 may be approximately ten inches (10 in.) and the overall width may be approximately two-and-a-half inches (2.5 in.). Taking the nominal thickness of the end and side walls 52, 54, 56, 60 to be one-quarter inch (0.25 in.), it follows that in this example the nominal inside width of the wall mount bracket 10, or the distance between inside surfaces of the opposite left and right side walls 56, 60, would be approximately two inches (2 in.), more about which is said below in connection with the L bracket 12 and its assembly with the wall mount bracket 10 as particularly illustrated in FIG. 8, where the inside width W1 of the wall mount bracket 10 is indicated. Staying with the main wall mount bracket 10, it is further noted consistent with the foregoing that particularly the opposed upper left and right slots 32, 36 are positioned in the respective left and right side walls 56, 60 substantially near the upper end wall 52, or essentially eight to nine inches (8-9 in.) above the lower end wall 54 and the general location of the L bracket 12 or of the bottom of any mounted expansion tank 30, thereby positioning the upper adjustable strap 42 substantially midway on the height of the tank 30, particularly for the "small" and "medium" (nominally 2- to 4-gallon) sized tanks 30. Relatedly, in the exemplary embodiment, the opposed left and right side wall recesses 57, 61 formed so as to be outwardly-facing from the respective left and right side walls 56, 60 are also formed therein nearer to the upper end wall 52, essentially between the upper slots 32, 36 and the lower slots 34,

38, it being appreciated that such expansion tanks 30 typically have a weld bead or seam 47 (FIG. 20) located substantially midway along the tank's length, thereby placing the seam 47 and thus the midpoint of the tank 30 between the upper and lower adjustable straps 42, 44 in this example. It will be further appreciated that the location, depth and width of the side wall recesses 57, 61 are such that a variety of sizes of tanks 30 and related locations of any tank seam 47 may be accommodated with the seam 47 thus clear of the left and right side walls 56, 60 as being positioned in the respective recesses 57, 61, thereby allowing the body of the tank 30 to be flush with the side walls 56, 60 when the tank 30 is mounted and the straps 42, 44 tightened down, again, more about which is said below. At the lower end of the wall mount bracket 10, the height or stand-off of the respective left and right side walls 56, 60 is shown as increased so as to form the left and right side wall shoulders 58, 62 that may cooperate in securing and supporting an installed expansion tank 30 in use and thereby meet and flush with the relatively higher lower end wall 54—in the exemplary embodiment the nominal height of the left and right side walls 56, 60 is approximately three-quarter inch (0.75 in.) transitioning up the shoulders 58, 62 to a nominal height at the lower end and of the lower end wall 54 of approximately one-and-a-half inches (1.5 in.). Similarly, for the exemplary L bracket 12, again by way of illustration and not limitation, the overall height or length L2 (FIG. 16) thereof may be approximately eight inches (8 in.) and the overall width may be approximately two inches (2 in.). In fact, taking again the nominal inside width of the wall mount bracket 10, or the distance between inside surfaces of the opposite left and right side walls 56, 60, to be approximately two inches (2 in.), it follows that the overall or outside width of L bracket 12, as measured from the outside surfaces of the respective left and right side walls 76, 82, would be slightly less than two inches (2 in.) in this example so as to allow some clearance between the respective side walls 56, 60, 76, 82 of the respective brackets 10, 12, for example, on the order of one-sixty-fourth to one-thirty-second of an inch (0.016-0.032 in.), where the outside width W2 of the L bracket 12 is indicated again in FIG. 8 along with the inside width W1 of the main wall mount bracket 10, it thus being true in all such arrangements that W2 is less than W1 at least to some extent. Similarly, the overall length L2 of the L bracket 12 is to be less than the overall length L1 of the main wall mount bracket 10 so as to again facilitate nesting of the L bracket 12 within the wall mount bracket 10 as again best shown in FIGS. 16 and 17. With further reference to the L bracket 12, it is noted consistent with the foregoing that particularly the opposed left and right side wall bottom notches 79, 85 are positioned in the respective left and right side walls 76, 82 substantially near the upper end wall 72, thereby positioning the selected adjustable strap 42 substantially midway on the height of the tank 30 in the exemplary third operational mode wherein the L bracket 12 serves to support a tank 30, typically only a "small" one, separately from any tank 30 mounted on the main wall mount bracket 10, as shown and described below in connection with FIGS. 19 and 20—while the notches 79, 85 are shown as lower than the recesses 77, 83, it will be appreciated that they may be under or directly opposite the recesses 77, 83 or much closer to the upper end wall 72 than shown. Further, in the exemplary embodiment, the opposed L bracket left and right side wall recesses 77, 83 formed so as to be outwardly-facing from the respective left and right side walls 76, 82 are also formed therein nearer to the upper end wall 72 so as to selectively accommodate the weld bead or seam 47 sometimes located along the tank's length when the L bracket 12 is nested within the main wall mount bracket 10 as in the exemplary second operational mode of the apparatus as illustrated in FIGS. 16-18 and so as to substantially align with the main wall mount bracket left and right side wall recesses 57, 61 as best seen in FIG. 17 for that same reason. Similarly, the respective upwardly- or outwardly-facing left and right side wall top notches 78, 84 are sized and configured to selectively accommodate or provide clearance for any weld seam 47 on a tank 30 installed on the L bracket 12 in the illustrated third operational mode. Notably, and with continued reference to the exemplary L bracket 12 illustrated in FIG. 1, there is shown formed in the L bracket body 70 an L bracket cut-out 26 sized and configured to provide clearance for or removable receipt of the nipple or connector 31 of an expansion tank 30 mounted on the apparatus in the exemplary first operational mode wherein the L bracket 12 is assembled at substantially a right angle to the main wall mount bracket 10 so as to cooperate in supporting any installed expansion tank 30 from beneath. Dimensionally, again noting that the nominal range of expansion tank diameters is roughly seven to twelve inches (7-12 in.) and thus that the radius of the tank 30 or the approximate location of the centered connector 31 relative to the perimeter wall of the tank 30 is on the order of three-and-a-half to six inches (3.5-6 in.), it follows that by sizing the cut-out 26 to be approximately four inches (4 in.) long and locating its lower edge, or its end closest to the lower end wall 74 of the L bracket 12, and specifically the plane of the edges of the wall mount bracket left and right side walls 56, 60, approximately three inches (3 in.) therefrom, the L bracket cut-out 26 is thus sized and located on the L bracket body 70 to effectively accommodate passage therethrough or clearance of the connector 31, which itself is typically a nominal three-quarter inch (0.75 in.) male connection, of the typical expansion tank 30 in use on the apparatus. In terms of mounting the L bracket 12 on the wall mount bracket 10 for use in the exemplary first operational mode illustrated in FIGS. 1-15 and related dimensional considerations, it is further observed that the wall mount bracket cut-out 40 is formed in the wall mount bracket body 50 at the lower end thereof substantially adjacent to the lower end wall 54 and sized and configured for receipt of the L bracket lower end wall 74 to somewhat "lock" the L bracket 12 into the wall mount bracket 10 during assembly and use as illustrated—in the exemplary embodiment, the width of both the wall mount bracket cut-out 40 and the L bracket lower end wall 74 are nominally one inch (1 in.), though again other sizes and configurations are possible according to aspects of the present invention. At the lower end of the L bracket 12, the height or stand-off of the respective left and right side walls 76, 82 is again shown as increased so as to form the L bracket left and right side wall shoulders 80, 86 that may cooperate in securing and supporting an installed expansion tank 30 in use in the third operational mode and would substantially conform to the ramped profile of the main wall mount bracket 10 when the L bracket 12 is nested therein as in the exemplary second operational mode—in the exemplary embodiment the nominal height of the left and right side walls 76, 82 is approximately one-half inch (0.5 in.) transitioning up the shoulders 80, 86 to a nominal height at the lower end and of the lower end wall 74 of approximately one inch (1 in.), which again allows for selective insertion of the L bracket lower end wall 74 within the wall mount bracket cut-out 40. Finally, staying with the foregoing exemplary dimensions, it will be appreciated that the pin 14 would have a nominal length of on the order of three inches (3 in.) so as to pass completely through the wall mount bracket 10 between respective cross-holes 59, 63. The diameter of the pin 14 may be in the range of one-eighth inch to one-half inch (0.12-0.5 in.) with the wall mount bracket cross-holes 59, 63 and the L bracket lower end cross-hole 88 sized accordingly. In the exemplary embodiment, the L bracket lower end cross-hole 88 is shown as non-annular to provide more clearance for the pin 14 and adjustability of the L bracket 12 on the wall mount bracket 10, though it will be appreciated that such is not necessary and that all such pins 14 and related cross-holes 59, 63, 88 may take any appropriate size and shape now known or later developed to allow for selective engagement of the L bracket 12 with the wall mount bracket 10. More generally, those skilled in the art will appreciate that all such configurations and dimensions of the various components of an expansion tank wall mount bracket apparatus according to aspects of the present invention are illustrative and non-limiting and may be varied from what is shown and described to suit a variety of applications, whether now know or later arising.

Figure 4:
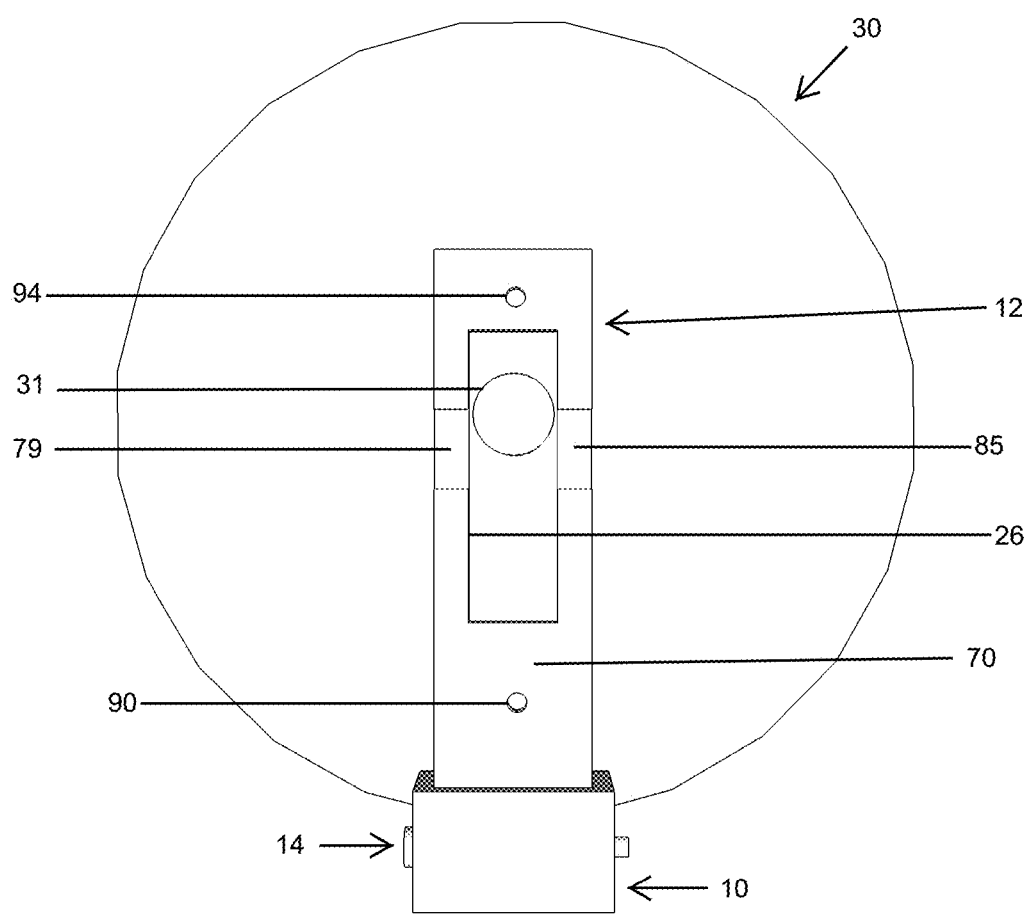
FIG. 4 is a bottom perspective view thereof in the first operational mode, with the adjustable straps removed for simplicity, in accordance with at least one embodiment.

Turning next to FIGS. 2-15, there are shown various views of the exemplary expansion tank wall mount bracket apparatus according to aspects of the present invention in the illustrated first operational mode wherein the L bracket 12 is oriented substantially perpendicular to the main wall mount bracket 10 such that the two brackets 10, 12 together form a somewhat "L" profile or assembly for supporting or securing an expansion tank 30, as again best seen in FIGS. 9, 11 and 13. Once more, generally, aspects of the inventive apparatus for mounting and securing an expansion tank 30 comprise a wall mount bracket 10, an L bracket 12, and a pin 14 which connects the wall mount bracket 10 and the L bracket 12 together, along with one or more adjustable straps 42, 44 which are removable from the wall mount bracket 10. As shown in FIG. 10, the exemplary components are assembled with the adjustable straps 42, 44 fastened as by passing them through the respective upper and lower slots 32, 36, 34, 38 in the wall mount bracket 10 with the free ends 17, 19 then passing through the D-ring ends 16, 18 of the straps 42, 44 to secure them at the desired diameter or position for the expansion tank 30 being installed, which is removed in FIG. 10 for clarity, as compared to FIG. 8 where the straps 42, 44 are shown unfastened, having distal space and not a solid strap, as prior to the insertion of an expansion tank 30. Once more, the wall mount and L brackets 10, 12 are configured in such a manner so that they may accommodate various size expansion tanks 30 as shown and described. In connection with the exemplary first operational mode, the wall mount bracket 10 is provided with three mounting holes 20, 22, 24 so as to selectively anchor the wall mount bracket 10 to a wall or other support structure (not shown) such that the wall mount bracket body 50 is substantially flush therewith, again, as by employing any appropriate screw or other fastener (not shown) now known or later developed. Notably, as best seen once more in FIGS. 9, 11 and 13, once an expansion tank 30 is installed on the apparatus as configured in the illustrated first operational mode, the body of the tank 30 is substantially flush with the somewhat vertical side walls 56, 60 of the wall mount bracket 10 when the tank 30 is mounted and the straps 42, 44 tightened down, the wall mount bracket side wall recesses 57, 61 accommodating a variety of sizes of tanks 30 and related locations of any tank seam 47. Furthermore, as best seen in FIG. 4, along with continued reference to FIGS. 9, 11 and 13, the expansion tank connector 31 is received within and passes through the L bracket cut-out 26 so that the bottom of the tank 30 may rest on the L bracket left and right side walls 76, 82 and/or one or more of the bracket shoulders 58, 62, 80, 86 so as to support the weight of the expansion tank 30 in cooperation with the one or more straps 42, 44 that snug the tank 30 against the wall mount bracket 10. Again, the load-bearing integrity of the L bracket 12 as assembled with the wall mount bracket 10 in this exemplary first operational mode is achieved in part by the design and construction of the brackets 10, 12 themselves, and particularly the optional engagement of the lower end wall 74 of the L bracket 12 with the cut-out 40 of the wall mount bracket 10, and in part by the configuration of the pin 14 and its engagement with the brackets 10, 12 through the respective cross-holes 59, 63, 88. That is, with the wall mount bracket 10 having a cut-out 40 at the bottom, as shown in FIG. 1, that is substantially the same size as the lower end wall 74 of the L bracket 12, this allows for the bottom of the L bracket 12 to not only be supported by the pin 14 but adds strength by allowing the L bracket 12, and the L bracket body 70, specifically, to lie flat on the bottom or lower end wall 54 of the wall mount bracket 10 while the top of the L bracket 12, or particularly the top edge of the L bracket lower end wall 74, to rest snugly against the top of the wall mount bracket cut-out 40 as can be seen in FIG. 9 of the assembled apparatus viewed somewhat from the back. Once more, those skilled in the art will appreciate that a variety of such configurations of the components and related assemblies and their use according to aspects of the present invention are possible without departing from its spirit and scope. It will also be appreciated that based on the geometries disclosed and related aspects, such as of the wall mount bracket recesses 57, 61 and the L bracket cut-out 40, along with the removable and selectively engageable straps 42, 44 and the locations of the respective strap notches 32, 34, 36, 38, a great deal of flexibility is provided in use of the apparatus, such as selectively employing one or both adjustable straps 42, 44 in the exemplary embodiment. In use of such an exemplary expansion tank wall mount bracket apparatus according to aspects of the present invention, upon or during the assembly of all the parts as shown and described herein, it will be appreciated that there is provided a relatively simple and universal means to install an expansion tank 30 by mounting it to a wall or other support structure such as shown, for example, in FIG. 9 in connection with the illustrated first operational mode involving the "L" assembly of the wall mount and L brackets 10, 12. Once the main wall mount bracket 10 is installed on a wall or other support structure (not shown) as by employing one or more of the screw holes 20, 22, 24, preferably at least two such holes and most preferably all three, the L bracket 12 is simply inserted into the wall mount bracket 10 employing the pin 14 as herein shown and described. Alternatively, the brackets 10, 12 may be first assembled using the pin 14 and then mounted to the support structure as an assembly. Either way, once secured to the wall or other support structure, one or more of the adjustable straps 42, 44 will be inserted into the respective upper and/or lower slots 32, 36 and/or 34, 38 formed on the wall mount bracket 10. The expansion tank 30 will then be placed on the L bracket 12 so that the nipple or connector 31 of the expansion tank 30 fits through the cut-out 26 formed in the L bracket 12. The user should slide the expansion tank 30 to the rear so that it sits substantially flush against the wall mount bracket 10 and then pull the free end 17 of the upper adjustable strap 42 around the expansion tank 30 and fit it through the D-ring end 16 and properly tighten to secure the expansion tank 30. If both straps 42, 44 are used, the same procedure would then be followed in securing the lower adjustable strap 44 in place around the tank 30. The expansion tank 30 is thus secured and ready for plumbing connection. If the apparatus is not in use for whatever reason, the L bracket 12 is designed as shown and described herein so that it can be simply inserted into or nested within the wall mount bracket 10 vertically and still secured with the pin 14 so the bracket does not protrude from the wall or the like so as not to cause any undue obstruction or hazard. Those skilled in the art will appreciate that if no expansion tank 30 is to be mounted, the L bracket 12 may simply be pivoted upwardly and rearwardly about the pin 14 and so nest within the main wall mount bracket 10 in the same orientation as the "L assembly" first operational mode, such that the back of the L bracket 12 would be visible, not the front as in FIGS. 16 and 17 when in the second operational mode of the apparatus the L bracket 12 is nested in the wall mount bracket 10 in such a way as to still best accommodate mounting of an expansion tank 30 on the wall mount bracket 10. Relatedly, it will be appreciated that for packaging and shipping purposes, the L bracket 12 could be nested within the wall mount bracket 10 in either or any orientation, it being appreciated that with the L bracket 12 oriented with its back facing out, which is not shown, a somewhat enclosed area or pocket would be formed between the wall mount and L brackets 10, 12, and particularly between the opposite and spaced apart wall mount and L bracket bodies 50, 70, so as to conveniently contain other components such as the pin 15 and the straps 42, 44.

Referring now to FIGS. 16-18, there is again shown the exemplary expansion tank wall mount bracket apparatus according to aspects of the present invention in the illustrated second operational mode wherein the L bracket 12 is not employed in vertically supporting the expansion tank 30 from beneath but is instead nested within the wall mount bracket 10 to provide further structural rigidity or support thereto and/or just to conveniently store the L bracket 12 until such time as it is needed in another operational mode of the apparatus, such as the illustrated alternative first and third operational modes. With reference to FIG. 16, the outside width W2 of the L bracket 12 is less than or equal to the inside width W1 of the main wall mount bracket 10 and similarly the overall length L2 of the L bracket 12 is than the overall length L1, sufficiently accounting for the thicknesses of the upper and lower end walls 52, 54, which in the exemplary embodiment are nominally one-quarter inch (0.25 in.) thick such that the length L2 of the L bracket 12 should be at least one-half inch (0.5 in.) less than the length L1 of the main wall mount bracket 10 so as to again facilitate nesting of the L bracket 12 within the wall mount bracket 10. Again, in use as when the wall mount bracket 10 is still to be employed in mounting an expansion tank 30 as shown in FIG. 18, the L bracket 12 may be oriented facing or opening outwardly as shown and simply inserted or nested within the wall mount bracket 10 after the wall mount bracket 10 is secured to an underlying wall or other support structure as herein described, the L bracket 12 being retained in such nested position initially by the pin 14 and eventually also by the lower adjustable strap 44 and/or the expansion tank 30 itself. As best seen in FIG. 17, the rectangular profile of the L bracket body 70 defined by the end and side walls 72, 74, 76, 82 preferably substantially conforms to or nests within the rectangular receptacle region bounded by the walls 52, 54, 56, 60 and body 50 of the wall mount bracket 10, again whether during packaging and shipment or use as here illustrated. Moreover, the opposite L bracket side walls 76, 82 are further formed having opposite and upwardly-facing left and right side wall recesses 77, 83 and opposite upwardly- and outwardly-facing left and right side wall shoulders 80, 86, which features cooperate in allowing a variety of expansion tanks 30 to be mounted on the apparatus in use as shown and described herein, it being particularly noted with reference to FIG. 17 that the right and left side wall recesses 83, 77 and the right and left side wall shoulders 86, 80 substantially conform to the respective wall mount bracket left and right side wall recesses 57, 61 and left and right side wall shoulders 58, 62, the nominally labeled "left" and "right" side features here being flipped due to the L bracket 12 being flipped from its orientation in the first operational mode for nesting within the wall mount bracket 10 as here in the illustrated second operational mode. Furthermore, at least one pair of opposed, inwardly-facing or -opening left and right L bracket side wall bottom notches 79, 85 are formed in the opposite side walls 76, 82 for selective receipt here of the lower adjustable straps 44 as aligned with and in further cooperation with the lower left and right slots 34, 38 formed in the wall mount bracket 10, it again being appreciated as seen in FIG. 17 that with the lower strap 44 so installed the body thereof crosses in front of the L bracket body 70 so as to again assist in retaining the L bracket 12 nested within the wall mount bracket 10. Additionally, in the exemplary second operational mode, an upper adjustable strap 42 is also employed as passing through the left and right upper slots 32, 36 formed in the wall mount bracket 10, here above and clear of the L bracket 12, and the L bracket upper end wall 72 specifically, a sufficient gap being formed between such L bracket upper end wall 72 and the adjacent, offset wall mount bracket upper end wall 52, such as when the difference between the overall length L2 of the L bracket 12 and the overall length L1 of the wall mount bracket 10 is relatively greater, though again, those skilled in the art will appreciate that a variety of such arrangements beyond those shown and described may be employed according to aspects of the present invention without departing from its spirit and scope. Once more, it will be appreciated that as the one or more straps 42, 44 are tightened to snug the expansion tank 30 against the wall mount bracket 10, and the left and right side walls 56, 60 specifically, the tank 30 is thereby frictionally held in place by the straps while the tank 30 is still supported vertically from beneath by the left and right side wall shoulders 58, 86, 80, 62 respectively, against which the bottom edge of the tank 30 is seated.

Figure 19:
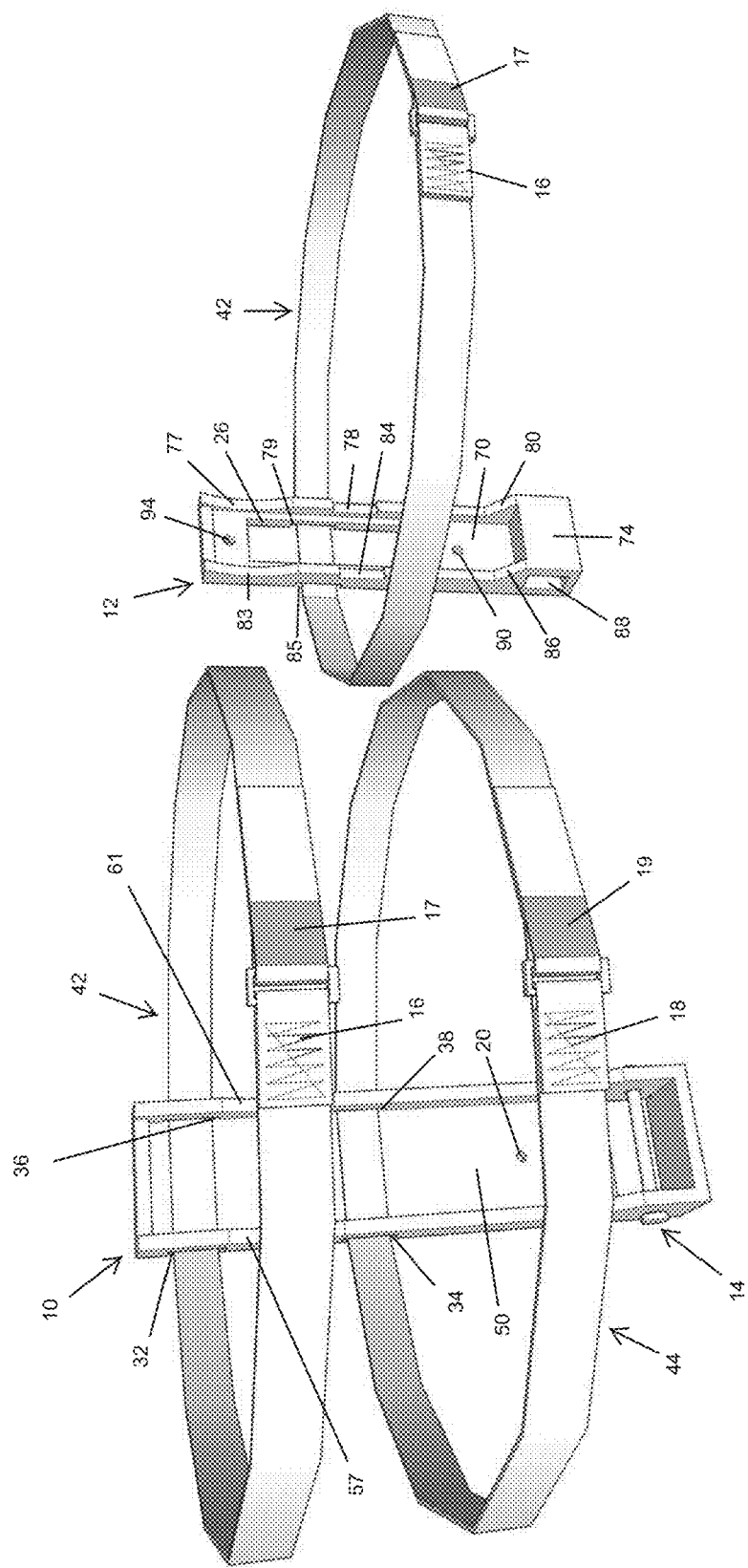
FIG. 19 is a perspective view thereof in a third operational mode, with the expansion tanks removed for simplicity, in accordance with at least one embodiment.
Figure 20:
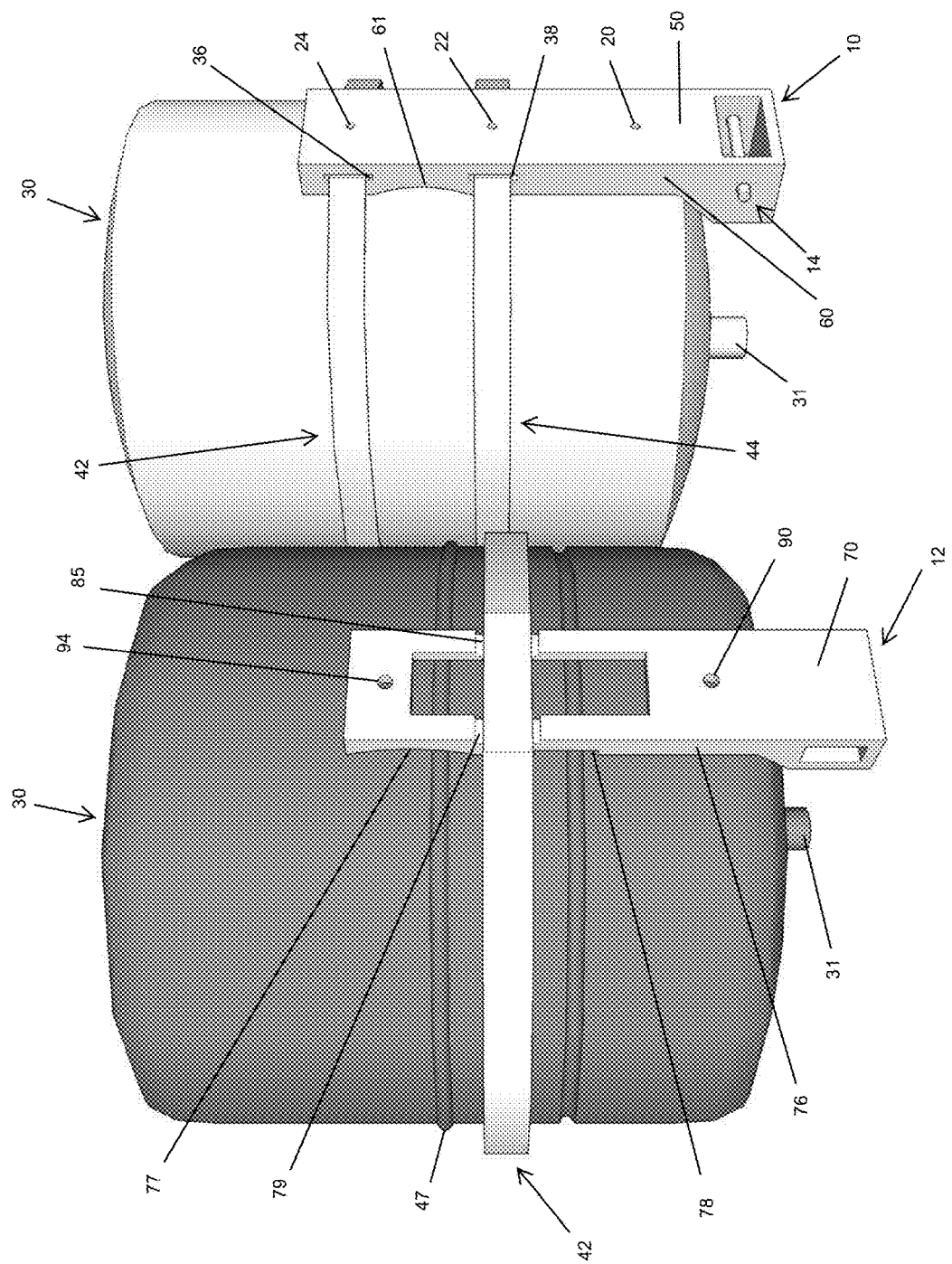
FIG. 20 is a rear perspective view thereof in the third operational mode, in accordance with at least one embodiment.

Finally, with reference to FIGS. 19 and 20, there is again shown the exemplary expansion tank wall mount bracket apparatus according to aspects of the present invention in the illustrated third operational mode wherein the wall mount and L brackets 10, 12 are not be assembled at all are instead both installed on a wall or other support structure (not shown) vertically so as to each separately mount an expansion tank 30 employing one or more straps 42, 44. With reference first to FIG. 19 and the main wall mount bracket 10 shown on the left, such would be installed and employed in much the same manner as in the second operational mode, only without the L bracket 12 nested therein and so the pin 14 merely inserted within the bracket 10 for storage or retention. The tank 30 is again still supported vertically from beneath in cooperation with the one or more straps 42, 44 by the wall mount bracket left and right side wall shoulders 58, 62 against which the bottom edge of the tank 30 would seat, with any seam 47 on the tank 30 clear of the left and right side walls 56, 60 due to the left and right side wall recesses 57, 61. Regarding the L bracket 12 that is here in the alternative exemplary third operational mode employed separately, as shown on the right in FIG. 19, the L bracket 12 is independently mounted on the wall or other support structure (not shown) as again by installing any appropriate fastener, whether now known or later developed, in at least one of the top and bottom screw holes 94, 90, preferably both. A single adjustable strap 42 may then be inserted through the opposite left and right side wall bottom notches 79, 85, between the left and right side walls 76, 82 and the underlying support structure, so as to then cooperate with the left and right side wall shoulders 80, 86 in supporting the expansion tank 30 as herein disclosed. In the exemplary embodiment, and with reference now to FIG. 20 illustrating the side-by-side brackets 10, 12 in use, it will be appreciated that two expansion tanks 30 may thus be conveniently mounted employing a single expansion tank wall mount bracket apparatus according to aspects of the present invention by separately installing the respective brackets 10, 12 as shown and described. Though the brackets 10, 12 are shown as installed substantially aligned and side-by-side, as when multiple water heaters may be co-located or additional volumetric capacity is required for a single water heater, the brackets 10, 12 may be so employed and installed in locations remote from each other as needed. In the use illustrated, a "medium" sized or nominal four-gallon tank 30 is installed on the main wall mount bracket 10 and a "small" sized or nominal two-gallon tank 30 is installed on the L bracket 12, though again, those skilled in the art will appreciate that a variety of such arrangements are possible according to aspects of the present invention, such that the illustrated arrangement is merely exemplary and non-limiting. Relatedly, in use particularly of the L bracket 12 to separately mount an expansion tank 30, it will again be appreciated that the opposite left and right side wall recesses 77, 83 may accommodate or provide clearance for a weld bead or seam 47 on the tank 30, while if a different or second lower seam were present or the tank were relatively smaller as might be the case in some contexts, the opposite left and right side wall top notches 78, 84 may provide further clearance, instead of or in addition to the left and right side wall recesses 77, 83. Similarly, though no seam 47 is shown on the tank 30 installed on the main wall mount bracket 10, were there one and it located substantially midway, it will be appreciated once more that the wall mount bracket left and right side wall recesses 57, 61 may again provide clearance therefor as needed. Once again, those skilled in the art will appreciate that a variety of configurations and arrangements of a versatile expansion tank wall mount bracket apparatus according to aspects of the present invention may be employed without departing from its spirit and scope, such that those shown and described are to be understood as illustrative and non-limiting.

More generally, the foregoing is for illustration purposes only of the overall design and principles of the expansion tank wall mount bracket apparatus according to aspects of the present invention. Since manufacturers may from time to time change the size and/or dimensions of their expansion tanks 30 it is to be expressly understood that the present invention may be modified to accommodate such changes; therefore, it is not desired to limit the invention to the exact construction and operation shown and described, and accordingly, all suitable modifications and equivalents may be resorted to as falling within the scope of the invention. With respect to the foregoing description, then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Ultimately, benefits of expansion tank wall mount bracket apparatus according to aspects of the present invention include being able to mount the code-required or otherwise selected expansion tank 30 to a wall in any position in a safe and secure manner, employing the versatility of the present invention in accommodating installation of a range of such expansion tanks 30 or even multiple expansion tanks 30 relatively quickly and easily, also then providing easy access for maintenance or replacement of any such mounted expansion tank 30. According to aspects of the present invention it will be appreciated that a single expansion tank wall mount bracket apparatus is thus capable of being mounted in multiple assembly configurations and supporting multiple expansion tanks, providing improved functionality and economy-of-scale savings.

Aspects of the present specification may also be described as follows:

1. An expansion tank wall mount bracket apparatus for selectively mounting an expansion tank, the apparatus comprising: a wall mount bracket having opposite wall mount bracket left and right side walls extending from a wall mount bracket body and defining therebetween a wall mount bracket inside width, the wall mount bracket being further formed having a wall mount bracket lower end wall and having at least one pair of opposing left and right slots formed in the respective wall mount bracket left and right side walls; an L bracket having opposite L bracket left and right side walls extending from an L bracket body and defining thereacross an L bracket outside width that is less than the wall mount bracket inside width, the L bracket being further formed having an L bracket lower end wall; a pin configured for selectively assembling the L bracket on the wall mount bracket as by positioning the L bracket lower end wall adjacent to the wall mount bracket lower end wall and the L bracket left and right side walls at least partially adjacent to the respective wall mount bracket left and right side walls and by passing the pin through opposite wall mount bracket left and right side wall cross-holes formed in the respective wall mount bracket left and right side walls and an intermediate L bracket lower end cross-hole formed in the L bracket left and right side walls together with the L bracket lower end wall; and an at least one adjustable strap configured for selectively passing through the at least one pair of opposing left and right slots to selectively retain the expansion tank against the wall mount bracket left and right side walls, wherein: in a first operational mode of the apparatus the L bracket is selectively assembled substantially perpendicular to the wall mount bracket as by positioning the L bracket body partially against the wall mount bracket lower end wall, whereby the expansion tank is supported on the L bracket in cooperation with the at least one adjustable strap retaining the expansion tank against the wall mount bracket; in a second operational mode of the apparatus the L bracket is selectively assembled substantially parallel to the wall mount bracket as by nesting the L bracket within the wall mount bracket with the L bracket lower end wall against the wall mount bracket lower end wall and the L bracket left and right side walls substantially adjacent to the respective wall mount bracket left and right side walls, whereby the expansion tank is supported on the wall mount bracket in cooperation with the at least one adjustable strap retaining the expansion tank against one or more of the wall mount bracket and the L bracket; and in a third operational mode of the apparatus the wall mount bracket and the L bracket are unassembled and separately employed in conjunction with multiple adjustable straps, whereby multiple expansion tanks are supported, one on the wall mount bracket and one on the L bracket.

2. The apparatus of embodiment 1 wherein the wall mount bracket further comprises opposite outwardly-facing wall mount bracket left and right side wall recesses providing clearance for a weld seam formed on the expansion tank.

3. The apparatus of embodiment 1 or embodiment 2 wherein the L bracket further comprises opposite outwardly-facing L bracket left and right side wall recesses substantially conforming to the wall mount bracket left and right side wall recesses and so cooperating therewith to provide clearance for a weld seam formed on the expansion tank in the second operational mode of the apparatus.

4. The apparatus of any of embodiments 1-3 wherein the L bracket further comprises opposite inwardly-facing left and right side wall bottom notches for selective passage therethrough of the at least one adjustable strap in the third operational mode of the apparatus, the L bracket left and right side wall recesses providing clearance for the weld seam formed on the expansion tank.

5. The apparatus of any of embodiments 2-4 wherein the wall mount bracket left and right side wall recesses are located vertically between the left and right slots formed in the respective wall mount bracket left and right side walls and the wall mount bracket lower end wall.

6. The apparatus of any of embodiments 1-5 wherein the wall mount bracket further comprises upwardly- and outwardly-facing wall mount bracket left and right side wall shoulders cooperating together with the at least one adjustable strap in securing and supporting the expansion tank.

7. The apparatus of any of embodiments 1-6 wherein the L bracket further comprises upwardly- and outwardly-facing L bracket left and right side wall shoulders substantially conforming to the wall mount bracket left and right side wall shoulders and so cooperating therewith to together and with the at least one adjustable strap secure and support the expansion tank in the second operational mode of the apparatus.

8. The apparatus of any of embodiments 1-7 wherein the L bracket further comprises opposite inwardly-facing left and right side wall bottom notches for selective passage therethrough of the at least one adjustable strap in the third operational mode of the apparatus, the L bracket left and right side wall shoulders cooperating together and with the at least one adjustable strap in securing and supporting the expansion tank in the third operational mode of the apparatus.

9. The apparatus of any of embodiments 1-8 wherein the L bracket further comprises opposite outwardly-facing left and right side wall top notches providing clearance for a weld seam formed on the expansion tank in the third operational mode of the apparatus.

10. The apparatus of any of embodiments 1-10 wherein the wall mount bracket is formed having two pairs of opposing left and right slots formed spaced apart in the respective wall mount bracket left and right side walls, the two pairs defining an upper pair of opposed upper left and right slots for selective receipt therethrough of an upper adjustable strap and a lower pair of opposed lower left and right slots for selective receipt therethrough of a lower adjustable strap.

11. The apparatus of any of embodiments 1-10 wherein the L bracket further comprises opposite inwardly-facing left and right side wall bottom notches substantially aligned with the lower left and right slots formed in the wall mount bracket for selective passage of the lower adjustable strap through both the lower left and right slots and the respective left and right side wall bottom notches in the second operational mode of the apparatus.

12. The apparatus of any of embodiments 1-11 wherein the wall mount bracket further comprises a wall mount bracket cut-out formed in the wall mount bracket body substantially adjacent to the wall mount bracket lower end wall for selective receipt of the L bracket lower end wall in the first operational mode of the apparatus.

13. The apparatus of any of embodiments 1-12 wherein the L bracket further comprises an L bracket cut-out formed in the L bracket body for selective receipt therethrough of a connector of the expansion tank in the first operational mode of the apparatus.

14. The apparatus of any of embodiments 1-13 wherein the wall mount bracket further comprises a plurality of screw holes formed in the wall mount bracket body for selectively mounting the wall mount bracket.

15. The apparatus of any of embodiments 1-14 wherein the wall mount bracket comprises three substantially vertically aligned wall mount bracket screw holes defining a wall mount bracket bottom screw hole, a wall mount bracket middle screw hole, and a wall mount bracket top screw hole.

16. The apparatus of any of embodiments 1-15 wherein the L bracket further comprises a plurality of screw holes formed in the L bracket body for selectively mounting the L bracket in the third operational mode of the apparatus.

17. The apparatus of any of embodiments 1-16 wherein the L bracket comprises two substantially vertically aligned L bracket screw holes defining an L bracket bottom screw hole and an L bracket top screw hole.

18. The apparatus of embodiment 17 wherein an L bracket cut-out formed in the L bracket body for selective receipt therethrough of a connector of the expansion tank in the first operational mode of the apparatus is positioned between the L bracket bottom screw hole and the L bracket top screw hole.

19. The apparatus of any of embodiments 1-18 wherein the at least one adjustable strap comprises a D-ring end and an opposite adjustable end.

20. The apparatus of any of embodiments 1-19 wherein the wall mount bracket is further formed having a wall mount bracket upper end wall substantially opposite of the wall mount bracket lower end wall and the L bracket is further formed having an L bracket upper end wall substantially opposite of the L bracket lower end wall.

21. The apparatus of embodiment 20 wherein the L bracket upper end wall is spaced from the wall mount bracket upper end wall in the second operational mode of the apparatus.

22. The apparatus of embodiment 20 or embodiment 21 wherein the wall mount bracket upper end wall and opposite wall mount bracket lower end wall define thereacross a wall mount bracket length, the L bracket upper end wall and opposite L bracket lower end wall define thereacross an L bracket length, and the L bracket length is less than the wall mount bracket length so as to facilitate nesting of the L bracket within the wall mount bracket in the second operational mode of the apparatus.

23. The apparatus of any of embodiments 1-22 wherein the L bracket body is substantially adjacent to the wall mount bracket body in the second operational mode of the apparatus.

24. The apparatus of any of embodiments 1-23 wherein the wall mount bracket lower end wall is taller than the wall mount bracket left and right side walls.

25. The apparatus of any of embodiments 1-24 wherein the L bracket lower end wall is taller than the L bracket left and right side walls.

26. The apparatus of any of embodiments 1-25 wherein the L bracket is shorter than the wall mount bracket so as to facilitate nesting therein in the second operational mode of the apparatus.

27. The apparatus of any of embodiments 1-26 wherein the L bracket is removably installed on the wall mount bracket in a first orientation wherein the L bracket body is substantially perpendicular to the wall mount bracket body and faces substantially upwardly in the first operational mode of the apparatus.

28. The apparatus of any of embodiments 1-26 wherein the L bracket is removably installed on the wall mount bracket in a second orientation wherein the L bracket body is substantially parallel and adjacent to the wall mount bracket body and faces substantially outwardly in the second operational mode of the apparatus.

29. The apparatus of any of embodiments 1-26 wherein the L bracket is removably installed on the wall mount bracket in a third orientation wherein the L bracket body is substantially parallel to and offset from the wall mount bracket body and faces substantially inwardly in the second operational mode of the apparatus.

30. The apparatus of any of embodiments 1-29 wherein the nominal tank diameter is in the range of approximately seven to twelve inches (7-12 in.) and the nominal tank height is in the range of approximately ten to fourteen inches (10-14 in.) and the wall mount bracket is approximately eight to twelve inches (8-12 in.) in length and approximately two to three inches (2-3 in.) in width.

31. The apparatus of any of embodiments 1-30 wherein the wall mount bracket has a length of approximately ten inches (10 in.) and an overall width of approximately two-and-a-half inches (2.5 in.).

32. The apparatus of any of embodiments 1-31 wherein the nominal inside width of the wall mount bracket defined as the distance between inside surfaces of the opposite wall mount bracket left and right side walls is approximately two inches (2 in.).

33. The apparatus of any of embodiments 1-32 wherein the L bracket is approximately seven to nine inches (7-9 in.) in length and approximately one-and-a-half to two-and-a-half inches (1.5-2.5 in.) in width.

34. The apparatus of any of embodiments 1-33 wherein the L bracket has a length of approximately eight inches (8 in.) and an overall width of approximately two inches (2 in.).

35. The apparatus of any of embodiments 1-34 wherein the nominal outside width of the L bracket defined as the distance across outside surfaces of the opposite L bracket left and right side walls is less than the nominal inside width of the wall mount bracket defined as the distance between inside surfaces of the opposite wall mount bracket left and right side walls.

36. The apparatus of any of embodiments 1-35 wherein the clearance between the L bracket left and right side walls and the respective wall mount bracket left and right side walls is in the range of approximately one-sixty-fourth to one-thirty-second of an inch (0.016-0.032 in.).

37. The apparatus of any of embodiments 1-36 wherein the nominal distance between a centered connector of the expansion tank and a perimeter wall of the expansion tank is approximately three-and-a-half to six inches (3.5-6 in.) and an L bracket cut-out formed in the L bracket body for selective receipt therethrough of the connector of the expansion tank in the first operational mode of the apparatus is approximately four inches (4 in.) long and positioned with a lower edge thereof closest to the L bracket lower end wall approximately three inches (3 in.) therefrom.

38. The apparatus of any of embodiments 1-37 wherein the nominal circumference range of the expansion tank is approximately twenty-two to thirty-eight inches (22-38 in.) and the overall length of the at least one adjustable strap is in the range of approximately twenty-four to forty inches (24-40 in.).

39. The apparatus of any of embodiments 1-38 wherein the at least one adjustable strap is at least forty inches (40 in.) long.

40. The apparatus of any of embodiments 1-39 wherein the overall width of the at least one adjustable strap is in the range of approximately one-half inch to two inches (0.5-2 in.).

41. The apparatus of any of embodiments 1-40 wherein the overall width of the at least one adjustable strap is approximately one inch (1 in.).

42. A method of employing an expansion tank wall mount bracket apparatus as defined in any one of embodiments 1-41, the method comprising the steps of: selectively assembling the L bracket on the wall mount bracket; positioning the expansion tank so as to make contact with and be supported by one or both of the L bracket and the wall mount bracket; and securing the expansion tank by passing the at least one adjustable strap through the at least one pair of opposed left and right slots of the wall mount bracket or through the opposed left and right side wall bottom notches of the L bracket and around the expansion tank.

43. The method of embodiment 42 wherein the step of selectively assembling the L bracket on the wall mount bracket comprises passing the pin through opposite wall mount bracket left and right side wall cross-holes formed in the respective wall mount bracket left and right side walls and an intermediate L bracket lower end cross-hole formed in the L bracket left and right side walls together with the L bracket lower end wall.

44. The method of embodiment 42 or embodiment 43, further comprising the step of selectively pivoting the L bracket about the pin relative to the wall mount bracket to shift the L bracket from a first orientation to a second orientation and the apparatus from the first operational mode to the second operational mode.

45. The method of any of embodiments 42-44 wherein the step of selectively assembling the L bracket on the wall mount bracket comprises orienting the L bracket body so as to be substantially perpendicular to the wall mount bracket body and face substantially upwardly in the first operational mode of the apparatus.

46. The method of any of embodiments 42-45 wherein the step of selectively assembling the L bracket on the wall mount bracket further comprises seating the L bracket lower end wall within the wall mount bracket cut-out.

47. The method of embodiment 45 or embodiment 46 wherein the step of positioning the expansion tank comprises passing the connector thereof through the L bracket cut-out so as to support the expansion tank from beneath on the opposite L bracket left and right side walls.

48. The method of any of embodiments 42-47 wherein the step of selectively assembling the L bracket on the wall mount bracket comprises orienting the L bracket body so as to be substantially parallel and adjacent to the wall mount bracket body and face substantially outwardly in the second operational mode of the apparatus.

49. The method of embodiment 48 wherein the step of positioning the expansion tank comprises seating a bottom end edge thereof on one or both of the wall mount bracket left and right side wall shoulders and the L bracket left and right side wall shoulders so as to support the expansion tank from beneath.

50. The method of any of embodiments 42-49 wherein the step of assembling the L bracket on the wall mount bracket comprises orienting the L bracket body so as to be substantially parallel to and offset from the wall mount bracket body and face substantially inwardly in the second operational mode of the apparatus.

51. The method of embodiment 50 comprising the further step of temporarily storing one or more of the pin and the at least one adjustable strap between the wall mount bracket and the L bracket as when packaging or shipping the apparatus in the second operational mode.

52. The method of any of embodiments 42-51 comprising the further step of fastening at least the wall mount bracket to a support structure.

53. The method of embodiment 52 wherein the step of fastening at least the wall mount bracket to a support structure precedes the step of selectively assembling the L bracket on the wall mount bracket.

54. The method of embodiment 52 wherein the step of fastening at least the wall mount bracket to a support structure follows the step of selectively assembling the L bracket on the wall mount bracket.

55. The method of embodiment 52 wherein the wall mount bracket and the L bracket are unassembled and are separately fastened to the support structure.

56. The method of embodiment 55 wherein the step of positioning the expansion tank so as to make contact with and be supported by one or both of the L bracket and the wall mount bracket further comprises positioning a first expansion tank against the wall mount bracket and positioning a second expansion tank against the L bracket.

57. The method of embodiment 56 wherein the bottom end edge of the first expansion tank seats on the wall mount bracket left and right side wall shoulders so as to support the first expansion tank from beneath and the bottom end edge of the second expansion tank seats on the L bracket left and right side wall shoulders so as to support the second expansion tank from beneath.

58. The method of embodiment 56 or embodiment 57 wherein the step of securing the expansion tank comprises passing at least a first adjustable strap through the at least one pair of opposed left and right slots of the wall mount bracket and around the first expansion tank and passing at least a second adjustable strap through the opposed left and right side wall bottom notches of the L bracket and around the second expansion tank.

59. The method of any of embodiments 42-58 wherein the step of positioning the expansion tank so as to make contact with and be supported by one or both of the L bracket and the wall mount bracket further comprises sliding the expansion tank rearwardly so as to sit substantially flush against the wall mount bracket or the L bracket.

60. The method of any of embodiments 42-59 wherein the step of securing the expansion tank further comprises passing the free end of the adjustable strap about the expansion tank and through the opposite D-ring end of the adjustable strap and folding the free end back onto the adjustable strap to tighten and secure the adjustable strap around the expansion tank.

61. The method of embodiment 60 wherein the step of securing the expansion tank further comprises passing the free end of a second adjustable strap through the second pair of opposed left and right slots of the wall mount bracket offset from the first pair of opposed left and right slots of the wall mount bracket around the expansion tank.

62. A kit comprising an expansion tank wall mount bracket apparatus as defined in any one of embodiments 1-41.

63. The kit of embodiment 62 further comprising at least two adjustable straps.

64. The kit of embodiment 62 or embodiment 63 further comprising three adjustable straps.

65. The kit of any of embodiments 62-64 further comprising an assortment of fasteners.

66. The kit of any of embodiments 62-65 further comprising instructional material.

67. The kit of embodiment 66 wherein the instructional material provides instructions on how to perform the method as defined in any one of embodiments 42-61.

68. Use of an expansion tank wall mount bracket apparatus as defined in any one of embodiments 1-41 to selectively and securely mount one or more expansion tanks.

69. The use of embodiment 68, wherein the use comprises a method as defined in any one of embodiments 42-61.

70. An expansion tank wall mount bracket apparatus for selectively mounting an expansion tank, the apparatus comprising: a wall mount bracket having opposite wall mount bracket left and right side walls extending from a wall mount bracket body and defining therebetween a wall mount bracket inside width and further having a wall mount bracket lower end wall, the wall mount bracket further comprising a wall mount bracket cut-out formed in the wall mount bracket body substantially adjacent to the wall mount bracket lower end wall and having at least one pair of opposing left and right slots formed in the respective wall mount bracket left and right side walls; and an L bracket having opposite L bracket left and right side walls extending from an L bracket body and defining thereacross an L bracket outside width that is less than the wall mount bracket inside width, the L bracket being further formed having an L bracket cut-out formed in the L bracket body and an offset L bracket lower end wall configured for selective insertion into the wall mount bracket cut-out, wherein: the L bracket is selectively assembled substantially perpendicular to the wall mount bracket as by positioning the L bracket body partially against the wall mount bracket lower end wall and the L bracket lower end wall within the wall mount bracket cut-out, whereby a connector of the expansion tank passes through the L bracket cut-out and the expansion tank is supported on the L bracket in cooperation with the wall mount bracket.

71. An expansion tank wall mount bracket apparatus for selectively mounting an expansion tank, the apparatus comprising: a wall mount bracket having opposite wall mount bracket left and right side walls extending from a wall mount bracket body and defining therebetween a wall mount bracket inside width, the wall mount bracket being further formed having a wall mount bracket lower end wall and upwardly- and outwardly-facing wall mount bracket left and right side wall shoulders substantially adjacent to the wall mount bracket lower end wall; and an L bracket having opposite L bracket left and right side walls extending from an L bracket body and defining thereacross an L bracket outside width that is less than the wall mount bracket inside width, the L bracket being further formed having an L bracket lower end wall and upwardly- and outwardly-facing L bracket left and right side wall shoulders substantially adjacent to the L bracket lower end wall and substantially conforming to the wall mount bracket left and right side wall shoulders, wherein: the L bracket is selectively assembled substantially parallel to the wall mount bracket as by nesting the L bracket within the wall mount bracket with the L bracket lower end wall substantially adjacent to the wall mount bracket lower end wall, the L bracket body substantially adjacent to the wall mount bracket body, and the L bracket left and right side walls substantially adjacent to the respective wall mount bracket left and right side walls, whereby the expansion tank is supported on the assembled wall mount and L brackets in cooperation with one or both of the respective wall mount and L bracket left and right side wall shoulders.

In closing, regarding the exemplary embodiments of the present invention as shown and described herein, it will be appreciated that a versatile expansion tank wall mount bracket apparatus according to aspects of the present invention is disclosed and configured for selectively and securely mounting one or more expansion tanks as desired. Because the principles of the invention may be practiced in a number of configurations beyond those shown and described, it is to be understood that the invention is not in any way limited by the exemplary embodiments but is able to take numerous forms without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention.

Certain embodiments of the present invention are described herein, including the best mode known to the inventor(s) for carrying out the invention. Of course, variations on these described embodiments will become apparent to those of ordinary skill in the art upon reading the foregoing description. The inventor(s) expect skilled artisans to employ such variations as appropriate, and the inventor(s) intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. The recitation of numerical ranges of values herein is merely intended to serve as a shorthand method of referring individually to each separate value falling within the range. Unless otherwise indicated herein, each individual value of a numerical range is incorporated into the specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as "first," "second," "third," etc.— for identified elements are used to distinguish between the elements, and do not indicate or imply a required or limited number of such elements, and do not indicate a particular position or order of such elements unless otherwise specifically stated.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the inventive subject matter and does not pose a limitation on the scope of the inventive subject matter otherwise claimed. No language in the application should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C and N, the text should be interpreted as requiring only one element from the group, not A plus N, or B plus N, etc.

While aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An expansion tank wall mount bracket apparatus for selectively mounting an expansion tank, the apparatus comprising:

a wall mount bracket having opposite wall mount bracket left and right side walls extending from a wall mount bracket body and defining therebetween a wall mount bracket inside width, the wall mount bracket being further formed having a wall mount bracket lower end wall and having at least one pair of opposing left and right slots formed in the respective wall mount bracket left and right side walls, the wall mount bracket further comprising opposite outwardly-facing wall mount bracket left and right side wall recesses;

an L bracket having opposite L bracket left and right side walls extending from an L bracket body and defining thereacross an L bracket outside width that is less than the wall mount bracket inside width, the L bracket being further formed having an L bracket lower end wall, the L bracket further comprising opposite outwardly-facing L bracket left and right side wall recesses substantially conforming to the wall mount bracket left and right side wall recesses;

and an at least one adjustable strap configured for selectively passing through the at least one pair of opposing left and right slots to selectively retain the expansion tank against the wall mount bracket left and right side walls, wherein:

in a first operational mode of the apparatus the L bracket is selectively assembled substantially perpendicular to the wall mount bracket as by positioning the L bracket body partially against the wall mount bracket lower end wall, whereby the expansion tank is supported on the L bracket in cooperation with the at least one adjustable strap retaining the expansion tank against the wall mount bracket, and further whereby the wall mount bracket left and right side wall recesses provide clearance for a weld seam formed on the expansion tank;

in a second operational mode of the apparatus the L bracket is selectively assembled substantially parallel to the wall mount bracket as by nesting the L bracket within the wall mount bracket with the L bracket lower end wall against the wall mount bracket lower end wall and the L bracket left and right side walls substantially adjacent to the respective wall mount bracket left and right side walls, whereby the expansion tank is supported on the wall mount bracket in cooperation with the at least one adjustable strap retaining the expansion tank against one or more of the wall mount bracket and the L bracket, and further whereby the L bracket left and right side wall recesses cooperate with the wall mount bracket left and right side wall recesses to provide clearance for the weld seam formed on the expansion tank; and in a third operational mode of the apparatus the wall mount bracket and the L bracket are unassembled and separately employed in conjunction with multiple adjustable straps, whereby multiple expansion tanks are supported, one on the wall mount bracket and one on the L bracket.

2. The apparatus of claim 1 wherein the L bracket further comprises opposite inwardly-facing left and right side wall bottom notches for selective passage therethrough of the at least one adjustable strap in the third operational mode of the apparatus.

3. The apparatus of claim 1 wherein the wall mount bracket further comprises upwardly- and outwardly-facing wall mount bracket left and right side wall shoulders cooperating together with the at least one adjustable strap in securing and supporting the expansion tank.

4. The apparatus of claim 3 wherein the L bracket further comprises upwardly- and outwardly-facing L bracket left and right side wall shoulders substantially conforming to the wall mount bracket left and right side wall shoulders and so cooperating therewith to together and with the at least one adjustable strap secure and support the expansion tank in the second operational mode of the apparatus.

5. The apparatus of claim 1 wherein the L bracket further comprises opposite outwardly-facing left and right side wall top notches providing clearance for a weld seam formed on the expansion tank in the third operational mode of the apparatus.

6. The apparatus of claim 1 wherein the wall mount bracket is formed having two pairs of opposing left and right slots formed spaced apart in the respective wall mount bracket left and right side walls, the two pairs defining an upper pair of opposed upper left and right slots for selective receipt therethrough of an upper adjustable strap and a lower pair of opposed lower left and right slots for selective receipt therethrough of a lower adjustable strap.

7. The apparatus of claim 1 wherein the wall mount bracket further comprises a wall mount bracket cut-out formed in the wall mount bracket body substantially adjacent to the wall mount bracket lower end wall for selective receipt of the L bracket lower end wall in the first operational mode of the apparatus.

8. The apparatus of claim 1 wherein the L bracket further comprises an L bracket cut-out formed in the L bracket body for selective receipt therethrough of a connector of the expansion tank in the first operational mode of the apparatus.

9. The apparatus of claim 1 wherein the wall mount bracket further comprises a plurality of screw holes formed in the wall mount bracket body for selectively mounting the wall mount bracket.

10. The apparatus of claim 1 wherein the L bracket further comprises a plurality of screw holes formed in the L bracket body for selectively mounting the L bracket in the third operational mode of the apparatus.

11. The apparatus of claim 1 wherein the at least one adjustable strap comprises a D-ring end and an opposite adjustable end.

12. The apparatus of claim 1 wherein the wall mount bracket is further formed having a wall mount bracket upper end wall substantially opposite of the wall mount bracket lower end wall and the L bracket is further formed having an L bracket upper end wall substantially opposite of the L bracket lower end wall and wherein the L bracket upper end wall is spaced from the wall mount bracket upper end wall in the second operational mode of the apparatus.

13. The apparatus of claim 12 wherein the wall mount bracket upper end wall and opposite wall mount bracket lower end wall define thereacross a wall mount bracket length, the L bracket upper end wall and opposite L bracket lower end wall define thereacross an L bracket length, and the L bracket length is less than the wall mount bracket length so as to facilitate nesting of the L bracket within the wall mount bracket in the second operational mode of the apparatus.

14. The apparatus of claim 1 wherein the L bracket is removably installed on the wall mount bracket in a first orientation wherein the L bracket body is substantially perpendicular to the wall mount bracket body and faces substantially upwardly in the first operational mode of the apparatus.

15. The apparatus of claim 1 wherein the L bracket is removably installed on the wall mount bracket in a second orientation wherein the L bracket body is substantially parallel and adjacent to the wall mount bracket body and faces substantially outwardly in the second operational mode of the apparatus.

16. The apparatus of claim 1 wherein the L bracket is removably installed on the wall mount bracket in a third orientation wherein the L bracket body is substantially parallel to and offset from the wall mount bracket body and faces substantially inwardly in the second operational mode of the apparatus.

17. An expansion tank wall mount bracket apparatus for selectively mounting an expansion tank, the apparatus comprising:

a wall mount bracket having opposite wall mount bracket left and right side walls extending from a wall mount bracket body and defining therebetween a wall mount bracket inside width and further having a wall mount bracket lower end wall, the wall mount bracket further having at least one pair of opposing left and right slots formed in the respective wall mount bracket left and right side walls; and an L bracket having opposite L bracket left and right side walls extending from an L bracket body and defining thereacross an L bracket outside width that is less than the wall mount bracket inside width, the L bracket being further formed having an L bracket cut-out formed in the L bracket body and an offset L bracket lower end wall configured for selective positioning adjacent to the wall mount bracket body, wherein:

the L bracket is selectively assembled substantially perpendicular to the wall mount bracket as by positioning the L bracket body partially against the wall mount bracket lower end wall and the L bracket lower end wall adjacent to the wall mount bracket body, whereby a connector of the expansion tank passes through the L bracket cut-out and the expansion tank is supported on the L bracket in cooperation with the wall mount bracket.

18. An expansion tank wall mount bracket apparatus for selectively mounting an expansion tank, the apparatus comprising:

a wall mount bracket having opposite wall mount bracket left and right side walls extending from a wall mount bracket body and defining therebetween a wall mount bracket inside width, the wall mount bracket being further formed having a wall mount bracket lower end wall and upwardly- and outwardly-facing wall mount bracket left and right side wall shoulders substantially adjacent to the wall mount bracket lower end wall; and an L bracket having opposite L bracket left and right side walls extending from an L bracket body and defining thereacross an L bracket outside width that is less than the wall mount bracket inside width, the L bracket being further formed having an L bracket lower end wall and upwardly- and outwardly-facing L bracket left and right side wall shoulders substantially adjacent to the L bracket lower end wall and substantially conforming to the wall mount bracket left and right side wall shoulders, wherein:

the L bracket is selectively assembled substantially parallel to the wall mount bracket as by nesting the L bracket within the wall mount bracket with the L bracket lower end wall substantially adjacent to the wall mount bracket lower end wall, the L bracket body substantially adjacent to the wall mount bracket body, and the L bracket left and right side walls substantially adjacent to the respective wall mount bracket left and right side walls, whereby the expansion tank is supported on the assembled wall mount and L brackets in cooperation with one or both of the respective wall mount and L bracket left and right side wall shoulders.

19. The apparatus of claim 1, further comprising a pin configured for selectively assembling the L bracket on the wall mount bracket as by positioning the L bracket lower end wall adjacent to the wall mount bracket lower end wall and the L bracket left and right side walls at least partially adjacent to the respective wall mount bracket left and right side walls and by passing the pin through opposite wall mount bracket left and right side wall cross-holes formed in the respective wall mount bracket left and right side walls and an intermediate L bracket lower end cross-hole formed in the L bracket left and right side walls together with the L bracket lower end wall.

20. An expansion tank wall mount bracket apparatus for selectively mounting an expansion tank, the apparatus comprising:

a wall mount bracket having opposite wall mount bracket left and right side walls extending from a wall mount bracket body, the wall mount bracket being further formed having a wall mount bracket lower end wall and having at least one pair of opposing left and right slots formed in the respective wall mount bracket left and right side walls;

an L bracket having opposite L bracket left and right side walls extending from an L bracket body, the L bracket being further formed having an L bracket lower end wall; and an at least one adjustable strap configured for selectively passing through the at least one pair of opposing left and right slots to selectively retain the expansion tank against the wall mount bracket left and right side walls, wherein:

in a first operational mode of the apparatus the L bracket is selectively assembled substantially perpendicular to the wall mount bracket as by positioning the L bracket body partially against the wall mount bracket lower end wall, whereby the expansion tank is supported on the L bracket in cooperation with the at least one adjustable strap retaining the expansion tank against the wall mount bracket;

in a second operational mode of the apparatus the L bracket is selectively assembled substantially parallel to the wall mount bracket as by nesting the L bracket within the wall mount bracket with the L bracket lower end wall against the wall mount bracket lower end wall and the L bracket left and right side walls substantially adjacent to the respective wall mount bracket left and right side walls, whereby the expansion tank is supported on the wall mount bracket in cooperation with the at least one adjustable strap retaining the expansion tank against one or more of the wall mount bracket and the L bracket; and in a third operational mode of the apparatus the wall mount bracket and the L bracket are unassembled and separately employed in conjunction with multiple adjustable straps, whereby multiple expansion tanks are supported, one on the wall mount bracket and one on the L bracket, the L bracket further comprising opposite inwardly-facing left and right side wall bottom notches for selective passage therethrough of the at least one adjustable strap in mounting an expansion tank on the L bracket in the third operational mode of the apparatus.

21. An expansion tank wall mount bracket apparatus for selectively mounting an expansion tank, the apparatus comprising:

a wall mount bracket having opposite wall mount bracket left and right side walls extending from a wall mount bracket body, the wall mount bracket being further formed having a wall mount bracket lower end wall and having at least one pair of opposing left and right slots formed in the respective wall mount bracket left and right side walls, the wall mount bracket further comprising upwardly- and outwardly-facing wall mount bracket left and right side wall shoulders;

an L bracket having opposite L bracket left and right side walls extending from an L bracket body, the L bracket being further formed having an L bracket lower end wall, the L bracket further comprising upwardly- and outwardly-facing L bracket left and right side wall shoulders substantially conforming to the wall mount bracket left and right side wall shoulders; and an at least one adjustable strap configured for selectively passing through the at least one pair of opposing left and right slots to selectively retain the expansion tank against the wall mount bracket left and right side walls, wherein:

in a first operational mode of the apparatus the L bracket is selectively assembled substantially perpendicular to the wall mount bracket as by positioning the L bracket body partially against the wall mount bracket lower end wall, whereby the expansion tank is supported on the L bracket in cooperation with the at least one adjustable strap retaining the expansion tank against the wall mount bracket;

in a second operational mode of the apparatus the L bracket is selectively assembled substantially parallel to the wall mount bracket as by nesting the L bracket within the wall mount bracket with the L bracket lower end wall against the wall mount bracket lower end wall and the L bracket left and right side walls substantially adjacent to the respective wall mount bracket left and right side walls, whereby the expansion tank is supported on the wall mount bracket in cooperation with the at least one adjustable strap retaining the expansion tank against one or more of the wall mount bracket and the L bracket, and further whereby the upwardly- and outwardly-facing wall mount bracket left and right side wall shoulders and the upwardly- and outwardly-facing L bracket left and right side wall shoulders cooperate together with the at least one adjustable strap in selectively securing and supporting the expansion tank; and in a third operational mode of the apparatus the wall mount bracket and the L bracket are unassembled and separately employed in conjunction with multiple adjustable straps, whereby multiple expansion tanks are supported, one on the wall mount bracket and one on the L bracket, and further whereby the upwardly- and outwardly-facing wall mount bracket left and right side wall shoulders and the upwardly- and outwardly-facing L bracket left and right side wall shoulders cooperate together with the multiple adjustable straps in selectively securing and supporting multiple expansion tanks.

* * * * *